(12) United States Patent
Hayes

(10) Patent No.: US 10,177,904 B2
(45) Date of Patent: Jan. 8, 2019

(54) LEVERAGING SECONDARY SYNCHRONIZATION SIGNAL PROPERTIES TO IMPROVE SYNCHRONIZATION SIGNAL DETECTION

(71) Applicant: Intel IP Corporation, Santa Clara, CA (US)

(72) Inventor: Matthew Hayes, Los Gatos, CA (US)

(73) Assignee: Intel IP Corporation, Santa Clara, CA (US)

( * ) Notice: Subject to any disclaimer, the term of this patent is extended or adjusted under 35 U.S.C. 154(b) by 197 days.

(21) Appl. No.: 15/385,879

(22) Filed: Dec. 21, 2016

(65) Prior Publication Data

US 2018/0176003 A1    Jun. 21, 2018

(51) Int. Cl.
*H04L 7/00*   (2006.01)
*H04L 7/04*   (2006.01)
*H04L 27/18*  (2006.01)
*H04L 5/14*   (2006.01)

(52) U.S. Cl.
CPC ............. *H04L 7/04* (2013.01); *H04L 7/0016* (2013.01); *H04L 27/18* (2013.01); *H04L 5/14* (2013.01)

(58) Field of Classification Search
CPC ......... H04L 7/04; H04L 7/0016; H04L 27/18; H04L 5/14
See application file for complete search history.

(56) References Cited

U.S. PATENT DOCUMENTS

| 9,065,630 B1 | 6/2015 | Xiao et al. |
| 2004/0043746 A1 | 3/2004 | Hiramatsu |
| 2005/0053048 A1 | 3/2005 | Van Der Wal et al. |
| 2009/0247157 A1 | 10/2009 | Yoon et al. |

(Continued)

FOREIGN PATENT DOCUMENTS

EP    1062746 B1    3/2004

OTHER PUBLICATIONS

International Search Report received for International Application No. PCT/US2017/060986, dated Mar. 8, 2018, 15 pages (Reference Purpose Only).

*Primary Examiner* — Shukri Taha
(74) *Attorney, Agent, or Firm* — Viering, Jentschura & Partner

(57) ABSTRACT

Disclosed is a method of synchronization signal correlation, comprising receiving a synchronization signal ("SS") on a plurality of receive antennas; performing a signal revision on the SS received on a first receive antenna, the signal revision comprising performing an element-wise squaring of the SS; calculating a complex coefficient by summing the element-wise squared SS; estimating a phase angle of the complex coefficient; and performing an element-wise phase correction of the SS; the method synchronization signal correlation further comprising performing the signal revision on the SS received on a second receive antenna; conditioning the revised signals by constructively and destructively combining the revised signals; selecting an optimized conditioned signal, wherein the optimized conditioned signal is the constructive or destructive combination with the largest Euclidian norm; correlating the optimized conditioned signal with a series of candidate SSs; and selecting the correlation with the largest magnitude as a transmitted SS.

20 Claims, 19 Drawing Sheets

(56) References Cited

U.S. PATENT DOCUMENTS

2014/0108020 A1* 4/2014 Sharma ................ G10L 19/018
  704/500
2015/0295631 A1* 10/2015 Yoshimoto ............ H04B 7/024
  370/329
2017/0317816 A1* 11/2017 Lei .......................... H04L 7/041

* cited by examiner

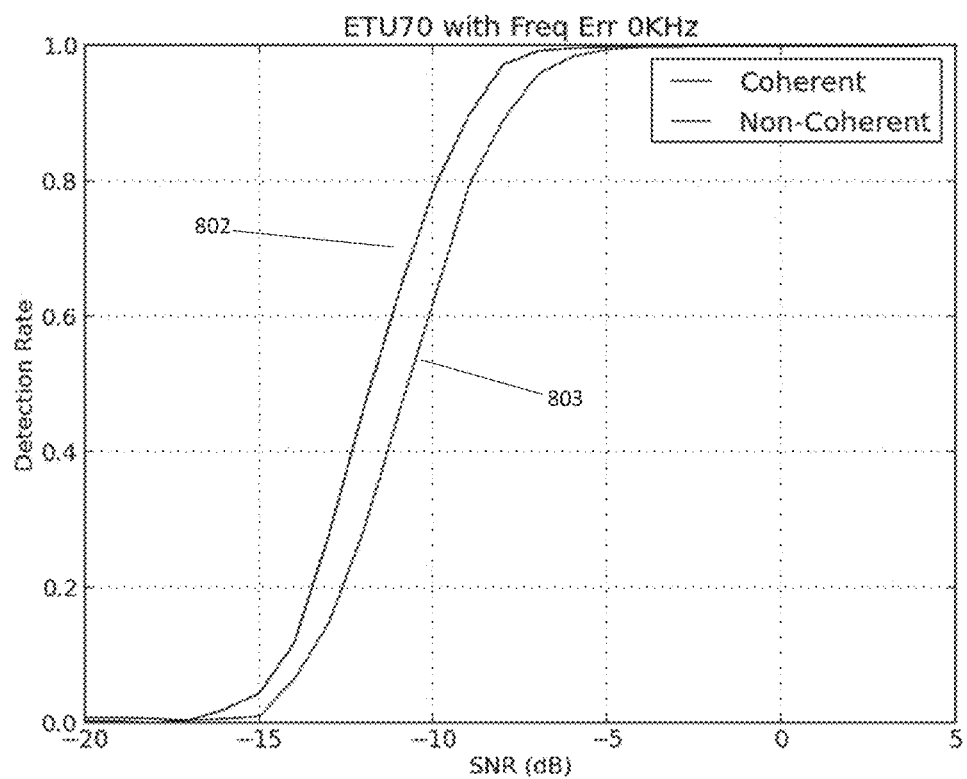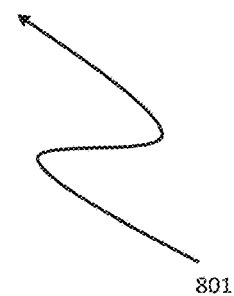
Fig. 8

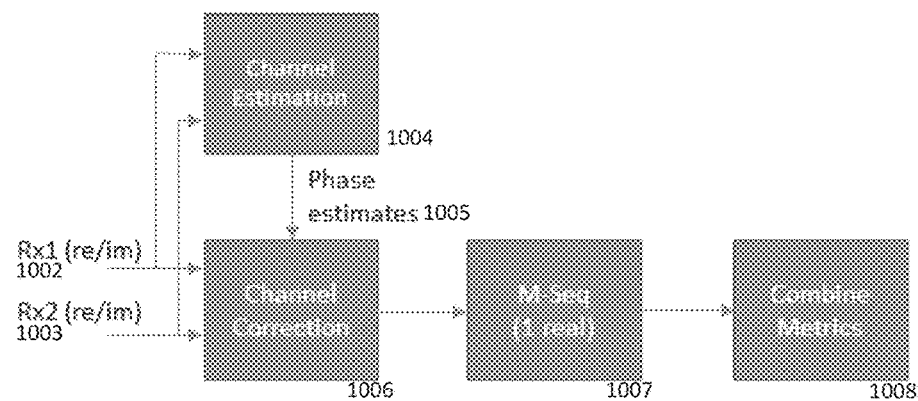
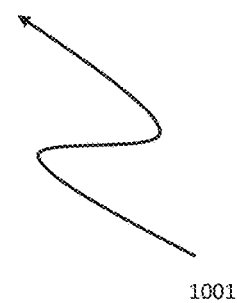
Fig. 10

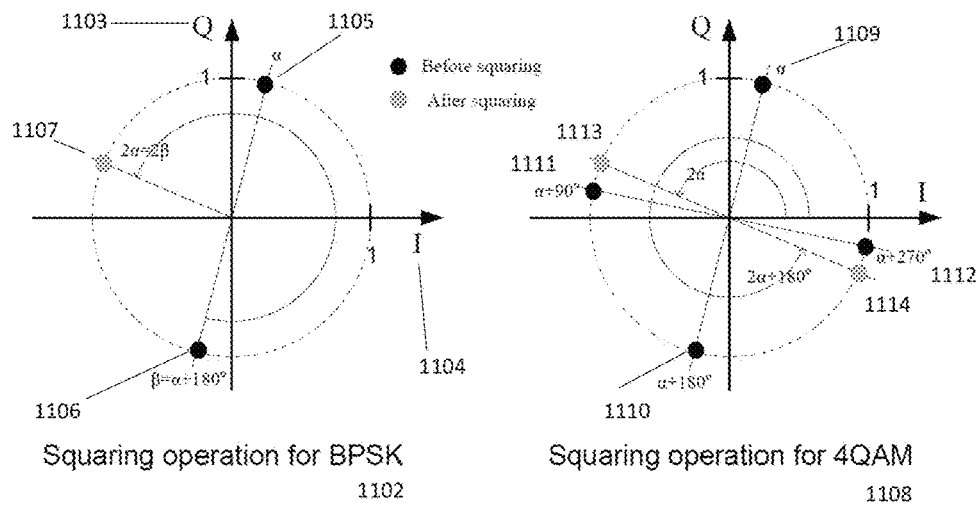
Squaring operation for BPSK
1102
Squaring operation for 4QAM
1108
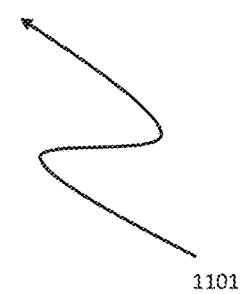
Fig. 11

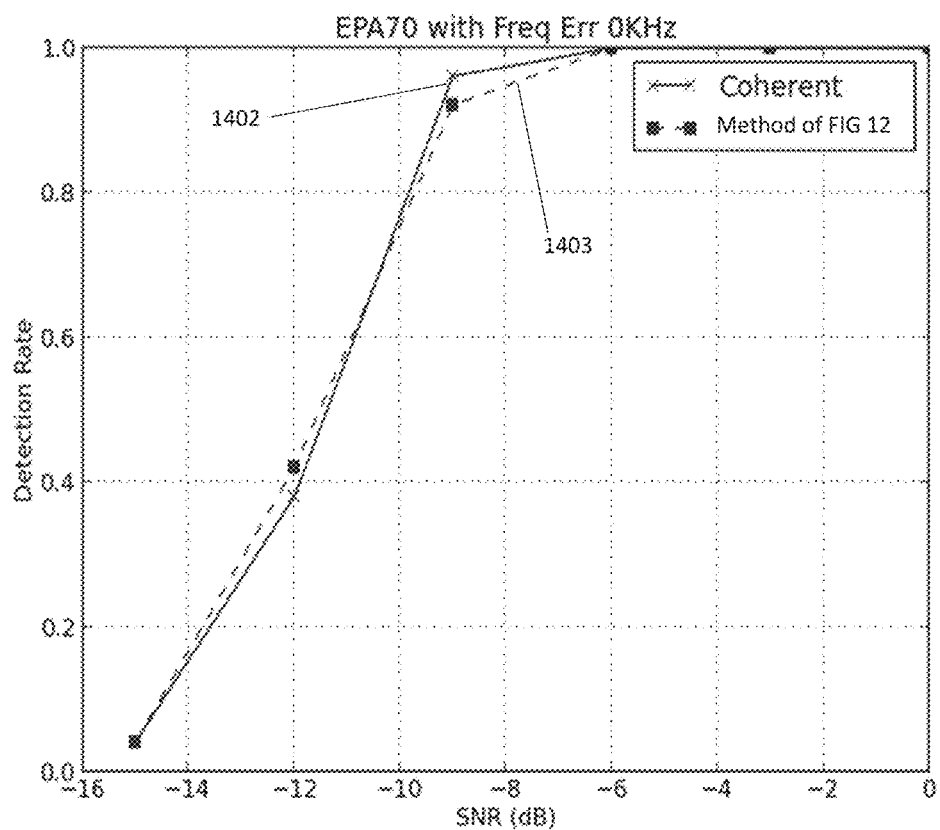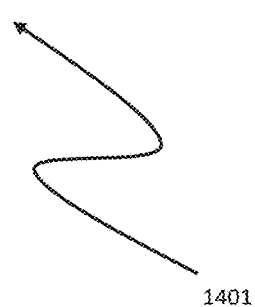
Fig. 14

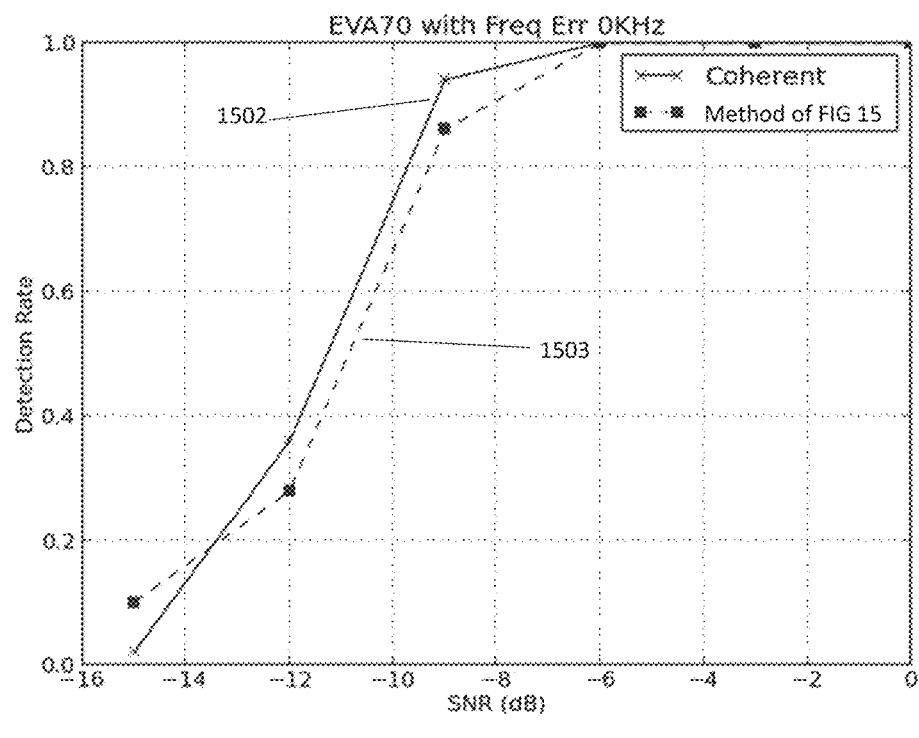
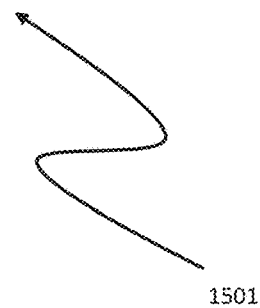
Fig. 15

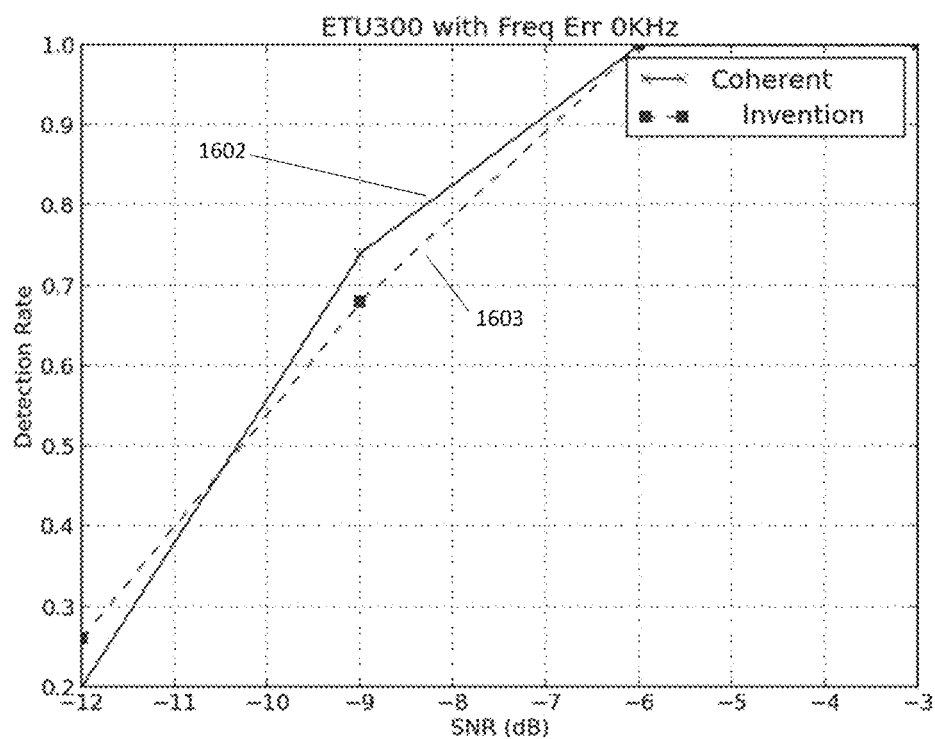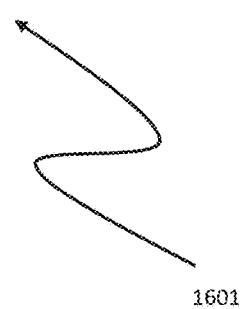
Fig. 16

```
%estimate channel phase (with 180 degree ambiguity)                    1701
ch1_phase_est = (angle(sum(ant1_prod))/2);
ch2_phase_est = (angle(sum(ant2_prod))/2);

%channel compensate data with RX ant combining                         1702
sss_norma   = ant1.*(exp(-j*ch1_phase_est)) +  ant2.*(exp(-
j*ch2_phase_est));
sss_ext     = ant1.*(exp(-j*ch1_phase_est)) -  ant2.*(exp(-
j*ch2_phase_est));

%check squences are channel adjusted - processed data                  1703
sss = sss_norma./(abs(ch(1))+abs(ch(2)))
sss = sss_ext./(abs(ch(1))+abs(ch(2)))

%generate rx sss data - freq-domain                                    1704
sss = 1+2*(1-randi(2,62,1));
ch  = (randn(2,1)+j*randn(2,1)).*(1/sqrt(2));
ant1 = sss.*ch(1);
ant2 = sss.*ch(2);

%remove BPSK modulation                                                1705
ant1_prod = ant1.*ant1;
ant2_prod = ant2.*ant2;
```

Fig. 17

LEVERAGING SECONDARY SYNCHRONIZATION SIGNAL PROPERTIES TO IMPROVE SYNCHRONIZATION SIGNAL DETECTION

TECHNICAL FIELD

Various embodiments relate generally to methods and devices for cell search and channel estimation.

BACKGROUND

Mobile cell search procedures may rely on detection of synchronization sequences in downlink signals to both identify and obtain synchronization with proximate cells. For example, in a Long-Term Evolution ("LTE") context as specified by the $3^{rd}$ Generation Partnership Project ("3GPP"), a mobile terminal may need to detect and identify Primary Synchronization Signal ("PSS") and Secondary Synchronization Signal ("SSS") sequences in downlink signals received from nearby cells. A mobile terminal may subsequently be able to obtain cell parameters such as cell identity (Physical Cell Identity "PCI"), cyclic prefix length (CP, extended or normal), duplex mode (Time Division Duplexing, "TDD," or Frequency Division Duplexing, "FDD"), and timing synchronization based on identification of such synchronization sequences. Mobile terminals may then proceed to utilize these cell parameters in essential mobility procedures, such as measurement reporting, network selection, cell selection and reselection, and handover. Looking beyond the LTE context, it is necessary to develop strategies for mobile cell search for 5G technologies and future implementations of Radio Access Technologies ("RAT").

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which:

FIG. 8 shows a comparison of Coherent Detection ("CD") in EPA70 Channel with an exemplary method of SSS detection according to this Disclosure;

FIG. 10 shows an exemplary method of CD;

FIG. 11 shows squaring operations for Binary Phase-Shift Keying ("BPSK") signals and Quadratic Amplitude Modulation ("4QAM") signals;

FIG. 14 shows an exemplary comparison of CD with the method described in FIG. 12 over EPA70;

FIG. 15 shows an exemplary comparison of CD with the method described in FIG. 12 over EVA70;

FIG. 16 shows an exemplary comparison of CD with the method described in FIG. 12 over ETU300;

FIG. 17 shows sample Matlab code for the method described herein.

DESCRIPTION

Figure 1:
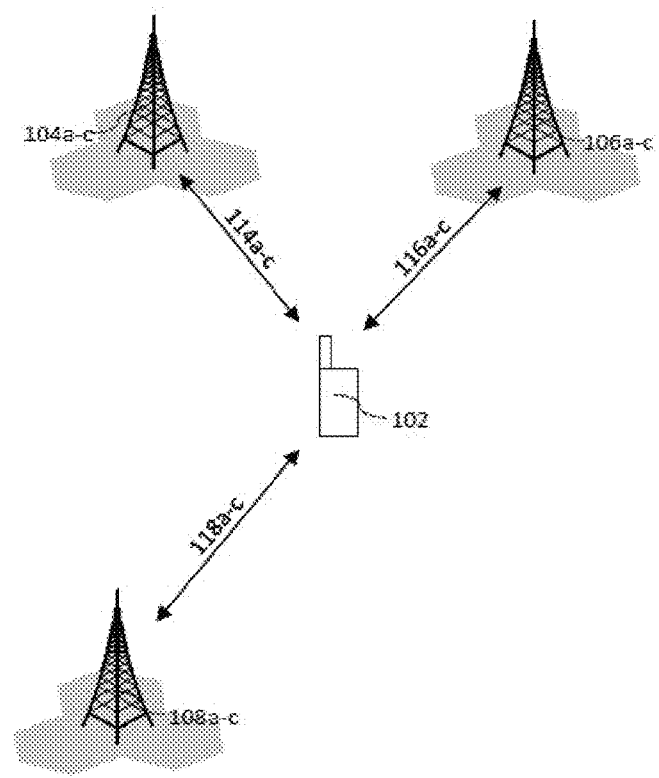
FIG. 1 shows an exemplary mobile device performing a cell search operation.

The following detailed description refers to the accompanying drawings that show, by way of illustration, specific details and aspects in which the Disclosure may be practiced.

The word "exemplary" is used herein to mean "serving as an example, instance, or illustration." Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB ("Enb"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short-Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

To detect new calls, a mobile device performs a self-search procedure similar to legacy RAT. Cell search is used to gain time/frequency synchronization to the transmission point ("TP") and acquire system parameters such as cell ID. For good performance and to minimize coverage outage, the cell search has to reliably detect new cells in low signal-to-noise ratio conditions to facilitate beam selection and inter-RAT handover at the cell edge.

In a wireless communication network synchronization was achieved through a two-stage detection process. Initial half frame (5 ms) timing was acquired through the time correction of the primary synchronization signal ("PSS") sequence, and secondary synchronization signal ("SSS") detection resolves the timing ambiguity to a radio frame boundary.

There are predominantly two methods for detection of SSS. The first method is coherent detection (CD), and the second method is non-coherent detection (NCD). CD utilizes the PSS as a pilot to estimate the channel phase. This is used to correct the phase of the received SSS so that multiple observations of the signal can be combined coherently. NCD does not perform channel correction and combines the multiple observations non-coherently, which results in degraded performance.

In TDD LTE systems, the PSS and SSS are not positioned closely, so the presumption that the channel layer remains static does not hold. Also, in proposed 5G physical layer, the PSS and SSS signals do not occupy the same bandwidth, and therefore in frequency-selective channels, PSS cannot be used to estimate the channel SSS will observe.

Cell search may be a vital first step in various cellular mobility procedures including measurement reporting, network selection, cell selection/reselection, and handover. For cell search in an LTE context, a mobile terminal may receive downlink signals on one or more frequency layers and process the received downlink signals to identify the presence of synchronization sequences such as PSS and SSS sequences transmitted by nearby cells. Mobile terminals may then identify and establish synchronization with detectable cells by identifying the PSS and SSS sequences.

Because each cell may not align its transmission schedule in time with other cells, a mobile terminal may not have prior knowledge of the timing locations of synchronization sequences transmitted by proximate cells. A mobile terminal may thus need to capture a block of downlink signal data that has a duration at least equal to the synchronization sequence transmission period and subsequently process the block of downlink data to detect the presence of any synchronization sequences. The mobile terminal may then identify proximate cells based on the detected synchronization sequences. For example, in the context of LTE, a single half-frame is 5 ms, which then requires that the mobile terminal capture at least 5 ms of downlink signal data and then process the 5 ms of data to detect the synchronization signals. Although the development of 5G technology is underway, the length of a half-frame in 5G is uncertain; however, based on the developments in 5G standards to date, it appears that a 5G half-frame will be significantly shorter than 5 ms.

A mobile terminal may calculate the cross-correlation in the time domain between a captured search probe (window of search data) and each of a predefined set of possible PSS sequences to identify potential timing locations of PSS sequences in the search probe. The mobile terminal may then use identified potential PSS timing locations for symbol timing to convert the captured search probe into the frequency domain and subsequently perform frequency-domain cross-correlation with each of a predefined set of possible SSS sequences to identify a transmitted SSS in the captured search probe. By identifying a match between the captured search probe and a PSS-SSS pair from the predefined sets of possible PSS and SSS sequences, a mobile terminal may obtain the identity of a candidate cell. A mobile terminal may identify multiple such matches at varying time points within the capture search probe at with different PSS-SSS pairs, and accordingly may obtain a list of candidate cells.

As previously indicated, a mobile terminal may receive a block of downlink data, e.g. a 5 ms search probe, or a shorter period corresponding to a frame length in 5G or another RAT, and process the downlink data in order to detect nearby cells. Depending on the location of the mobile terminal, a search probe may include detectable contributions from various proximate cells.

FIG. 1 shows an exemplary scenario in which mobile terminal 102 is located proximate to base stations 104, 106, and 108. Each of base stations 104-108 may be sectorized (e.g. with sectorized antenna systems) and accordingly composed of multiple "sectors" or "cells", such as cells 104a, 104b, and 104c for base station 104, cells 106a, 106b, and 106c for base station 106, and cells 108a, 108b, and 108c for base station 108. The wireless channels 114a-114c, 116a-116c, and 118a-118c may represent the discrete wireless channels between each of respective cells 104a-104c, 106a-106c, and 108a-108c.

Figure 2:
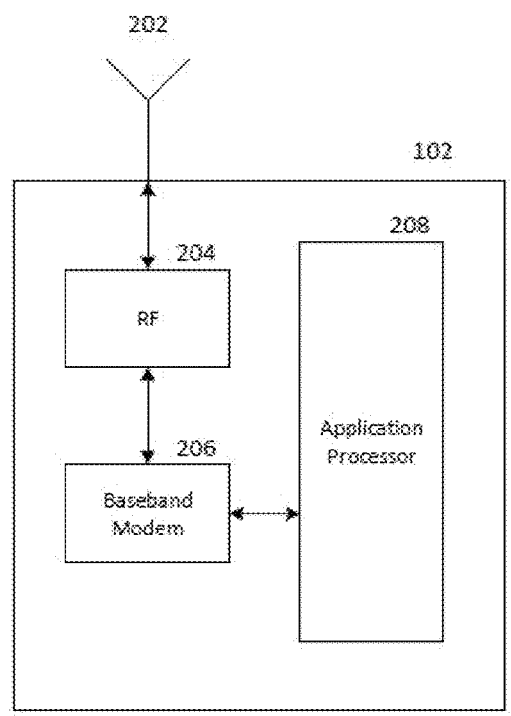
FIG. 2 shows an exemplary internal configuration of mobile terminal.

FIG. 2 shows an internal configuration of mobile terminal 102. As shown in FIG. 2, mobile terminal 102 may include antenna system 202, RF transceiver 204, baseband modem 206, and application processor 208. Mobile terminal 102 may have one or more additional components not explicitly depicted in FIG. 2, such as additional hardware, software, or firmware elements including processors/microprocessors, controllers/microcontrollers, memory, other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) ("SIM") etc.

In an abridged overview of the operation of mobile terminal 102, mobile terminal 102 may be configured to receive and/or transmit wireless signals according to one or more wireless access protocols or RATs, including any one or combination of 5G, LTE. WLAN, Wi-Fi, UMTS, GSM, Bluetooth, CDMA. WCDMA, etc. The RAT capabilities of mobile terminal 102 may be determined by one or more SIMs included in mobile terminal 102 (not explicitly shown in FIG. 2). It is appreciated that separate components may be provided for each distinct type of compatible wireless signals, such as a dedicated 5G antenna, 5G RF transceiver, and dedicated 5G baseband modem for 5G reception and transmission, a dedicated UMTS antenna. UMTS RF transceiver and UMTS baseband modem, a dedicated Wi-Fi antenna. Wi-Fi RF transceiver, and Wi-Fi baseband modem for Wi-Fi reception and transmission, etc., in which case antenna 202, RF transceiver 204, and baseband modem 206 may each respectively be an antenna system. RF transceiver system, and a baseband modem system composed of the individual dedicated components. Alternatively, one or more components of mobile terminal 102 may be shared between different wireless access protocols, such as e.g. by sharing antenna 202 between multiple different wireless access protocols, e.g. by using a common RF transceiver 204 shared between multiple wireless access protocols, e.g. a common baseband modem 206 shared between multiple wireless access protocols, etc. In an exemplary aspect of disclosure, RF transceiver 204 and/or baseband modem 206 may be operated according to multiple mobile communication access protocols (i.e. "multi-mode"), and thus may be configured to support one or more of LTE, UMTS, and/or GSM access protocols.

Further to the abridged overview of operation of mobile terminal 102, RF transceiver 204 may receive radio frequency wireless signals via antenna 202, which may be implemented as e.g. a single antenna or an antenna array composed of multiple antennas. RF transceiver 204 may include various reception circuitry components, which may include analog circuitry configured to process externally received signals such as e.g. mixing circuitry to convert externally received RF signals to baseband and/or intermediate frequencies. RF transceiver 204 may also include amplification circuitry to amplify externally received signals, such as power amplifiers ("PA" s) and/or Low Noise Amplifiers ("LNA" s), although it is appreciated that such components may also be implemented separately from RF transceiver 204. RF transceiver 204 may additionally include various transmission circuitry components configured to transmit internally received signals, such as e.g. baseband and/or intermediate frequency signals provided by baseband modem 206, which may include mixing circuitry to modulate internally received signals onto one or more radio frequency carrier waves and/or amplification circuitry to amplify internally received signals before transmission. RF transceiver 204 may provide such signals to antenna 202 for wireless transmission. Further references herein to reception and/or transmission of wireless signals by mobile terminal 102 may thus be understood as an interaction between antenna 202, RF transceiver 204, and baseband modem 206 as detailed above. Although not explicitly depicted in FIG. 2, RF transceiver 204 may be additionally be connected to application processor 208.

Figure 3:
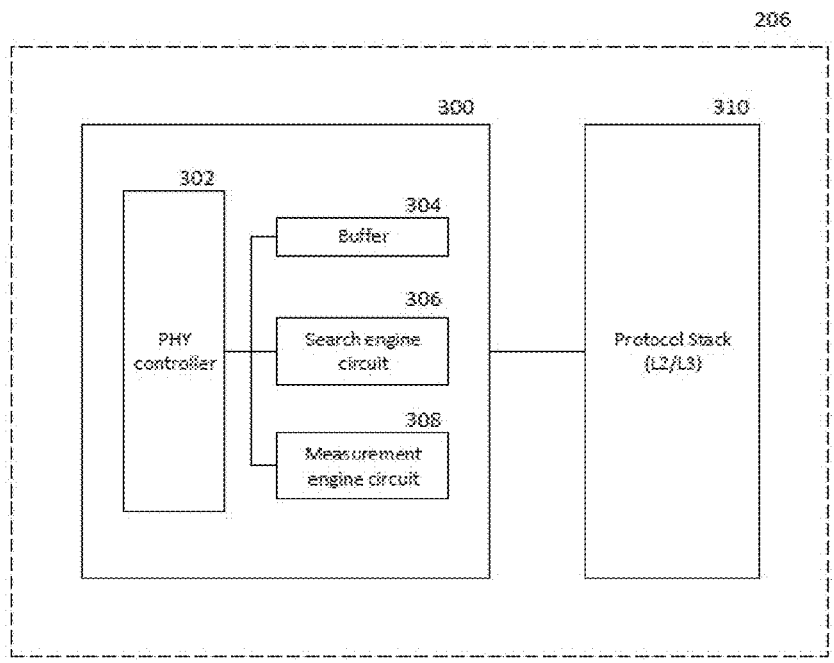
FIG. 3 depicts an exemplary internal configuration of a baseband modem.

FIG. 3 depicts an internal configuration of baseband modem 206. As shown in FIG. 3, baseband modem 206 may be composed of a physical layer ("PHY," Layer 1) subsystem 300 and a protocol stack (Layers 2 and 3) subsystem 310. Although not explicitly shown in FIG. 3, baseband modem 206 may additionally include various additional baseband processing circuitry, such as Analog to Digital Converters ("ADC"s) and/or Digital to Analog Converters (DACs), modulation/demodulation circuitry, encoding/decoding circuitry, audio codec circuitry, digital signal processing circuitry, etc.

Baseband modem 206 may be responsible for mobile communication functions of mobile terminal 102, and may be configured to operate in conjunction with RF transceiver 204 and antenna system 202 to transmit and receive mobile communication signals in accordance with various mobile communication protocols. Baseband modem 206 may be responsible for various baseband signal processing operations for both uplink and downlink signal data. Accordingly, baseband modem 206 may obtain and buffer baseband downlink and uplink signals and subsequently provide the buffered downlink signals to various internal components of baseband modem 206 for respective processing operations.

PHY subsystem 300 may be configured to perform control and processing of physical layer mobile communication functions, including error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. As shown in FIG. 3, PHY subsystem 300 may include signal buffer 304, which may be a memory component configured to hold digital signal samples, e.g. as obtained via RF transceiver 204 (downlink) or protocol stack subsystem 310 (uplink). Search engine 306, measurement engine 308, and additional signal processing components of PHY subsystem 300 may be configured to access signal buffer 304 and process the baseband digital samples according to the corresponding signal processing functions of the respective components. Signal buffer 304 is represented as a single component in FIG. 3 for simplicity, and alternatively each component or given groups of components may have a dedicated buffer to hold digital signal samples for processing. Although not explicitly depicted in FIG. 3, the aforementioned functionality of PHY subsystem 300 may be realized as hardware and/or software (program code executed on a processor) components under the control of PHY controller 300. Skilled persons will appreciate the ability to implement the algorithmic, control, and I/O logic for such signal processing operations as either hardware or software logic with substantially equivalent functionality. PHY subsystem 300 may additionally include a non-transitory computer readable medium to store program code for retrieval by PHY controller 302, search engine circuit 306, measurement engine circuit 308, and other processors of PHY subsystem 300.

PHY controller 302 may be realized as a processor configured to execute physical layer control software and control the various components of PHY subsystem 300 under the direction of the control logic defined therein in order to provide the requisite physical layer functionality to mobile terminal 102. As further detailed below, PHY controller 302 may be configured to control search engine 306 and measurement engine 308 to perform cell search and measurement procedures.

Baseband modem 206 may additionally include protocol stack subsystem 310, which may be responsible for the Layer 2 and Layer 3 functionality of the protocol stack. In an LTE context, protocol stack subsystem 310 may be responsible for Medium Access Control ("MAC"), Radio Link Control ("RLC"), Packet Data Convergence Protocol ("PDCP"), Radio Resource Control ("RRC"), Non-Access Stratum ("NAS"), and Internet Protocol ("IP") entity processes. Protocol stack subsystem 310 may be realized as a processor configured to execute protocol stack software and control mobile communication operations of mobile terminal 102 under the direction of control logic defined therein. Protocol stack subsystem 310 may interact with PHY subsystem 300, such as via an interface with PHY controller 302, to request physical layer services as specified by the protocol stack control logic including physical layer configuration and radio measurement. Protocol stack subsystem 310 may supply PHY subsystem 300 with downlink transport channel data (MAC data) scheduled for subsequent physical layer processing and transmission by PHY subsystem 300 (via RF transceiver 204 and antenna system 202). PHY subsystem 300 may conversely receive uplink physical channel data via (via RF transceiver 204 and antenna system 202) and perform subsequent physical layer processing on the received uplink physical channel data before providing the uplink physical channel data to protocol stack subsystem 300 as uplink transport channel data (MAC data). Subsequent reference to transmission and reception of signals by mobile terminal 102 may thus be understood as an interaction between antenna system 202, RF transceiver 204, and baseband modem 206 (PHY subsystem 300 and protocol stack subsystem 310) as thus detailed.

Baseband modem 206 may additionally interface with application processor 208, which may be implemented as a Central Processing Unit ("CPU") and configured to execute various applications and/or programs of mobile terminal 102, such as e.g. applications corresponding to program code stored in a memory component of mobile terminal 102 (not explicitly shown in FIG. 2). Application processor 208 may be configured to run an operating system ("OS") of mobile terminal 102, and may utilize the interface with baseband modem 206 in order to transmit and receive user data such as voice, video, application data, basic Internet/web access data, etc. Application processor 208 may also be configured to control one or more further components of mobile terminal 102, such as user input/output devices (display(s), keypad(s), touchscreen(s), speaker(s), external button(s), camera(s), microphone(s), etc.), peripheral devices, memory, power supply, external device interfaces, etc. Although depicted separately in FIG. 2, part or all of the detailed functionality of baseband modem 206 may be implemented at application processor 208, such as by executing the functionality of baseband modem 206 as software executed by the processor core of application processor 108 (e.g. in particular physical layer subsystem 300 and protocol stack subsystem 310). Such is recognized as providing equivalent functionality and the disclosure is thus not limited to either architecture.

Mobile terminal 102 may transmit and receive data with various network cells, such as e.g. cells 104a-104c, 106a-106c, and 108a-108c, according to the protocol stack and physical layer operations directed by physical layer subsystem 300 and protocol stack subsystem 310. As previously indicated, mobile terminal 102 may perform cell search in order to detent and potentially further interact with proximate network cells.

In the exemplary scenario of FIG. 1, each of cells 104a-104c, 106a-106c, and 108a-108c may be transmitting on a given first frequency layer, i.e. may be transmitting on the same carrier frequency. Base stations 104-108 may additionally each have one or more cells transmitting on one or more additional frequency layers (e.g. cells 104d-104f for base station 104, cells 106d-106f for base station 106, and cells 108d-108f for base station 108 (not shown in FIG. 1) may transmit on a second frequency layer), and accordingly the following description focusing on a single frequency layer may analogously apply to one or more additional frequency layers. During a cell search procedure, mobile terminal 102 may aim to identify all detectable cells on one or more target frequency layers, which may include the aforementioned first frequency layer of cells 104a-104c, 106a-106c, and 108a-108c.

Mobile terminal 102 may thus trigger a cell search at a given point in time, which may be e.g. determined based on the mobility environment of mobile terminal 102 as observed by an RRC entity of protocol stack subsystem 310. For example, the RRC entity may determine based on a combination of network instruction and previous radio measurements that radio measurements should be performed as part of cell reselection or handover procedures. Alternatively, mobile terminal 102 may be implementing a power-up procedure (from a device power-off or a sleep state) or may be recovering from an Out of Coverage (OOC) scenario, and consequently may need to perform network selection (e.g. PLMN selection) and/or cell selection.

The RRC entity may thus request a cell search from PHY controller 302, which may subsequently trigger a cell search at search engine circuit 306. Search engine circuit 306 may be implemented as a hardware and/or software system, and may be configured to receive and process digital signals provided to baseband modem 206 from RF transceiver 204 in order to perform cell search and detection. Physical layer subsystem 300 may receive and store digitized downlink signals (soft data) in buffer 304, which search engine circuit 306 may evaluate to detect cells. Search engine circuit 306 may subsequently report detected cells to PHY controller 302, which PHY controller 302 may proceed to trigger measurement for at measurement engine circuit 308 and/or report to the RRC entity of protocol stack subsystem 310. Search engine circuit 306 thus be configured to receive search probes of downlink signal data (stored in buffer 304) and process the received search probes to detect PSS and SSS sequences from proximate cells.

Search engine circuit 306 may be configured to obtain a list of candidate cells based on initial PSS and SSS detection, which may include identifying candidate cells based on PSS and SSS pairs that produce sufficient cross-correlation values with local copies of the predefined SSS and SSS sequences.

Search engine circuit 306 may demodulate the detected SSS symbol vector and subsequently evaluate phase offsets between the elements of the demodulated SSS symbol vector.

Search engine circuit 306 may first obtain an initial candidate cell list via PSS and SSS detection. Search engine circuit 306 may thus capture a search probe of downlink signal data and process the search probe in order to identify contributions from any proximate cells (such as e.g. any one or more of cells 104a-104c, 106a-106c, and 108a-108c) that are detectable in the form of PSS and SSS sequences contained in the search probe. For example, in the context of LTE, this would require received signal on the downlink. In the context of 5G, the exact duration of a half-frame is undetermined; however, at least a half duration of downlink signal equaling one half-frame in 5G would be required. The search engine circuit 306 may obtain the search probe of downlink signal data following radio frequency demodulation and digitization (e.g. at RF transceiver 204) and store the digital samples of the search probe in signal buffer 304.

Search engine circuit 306 may proceed to process the digital samples of the search probe stored in buffer 304 to identify the presence of any PSS and SSS sequences. Responding 5G cells may transmit a PSS and an SSS sequence every half-frame according to a fixed pattern.

Figure 4:
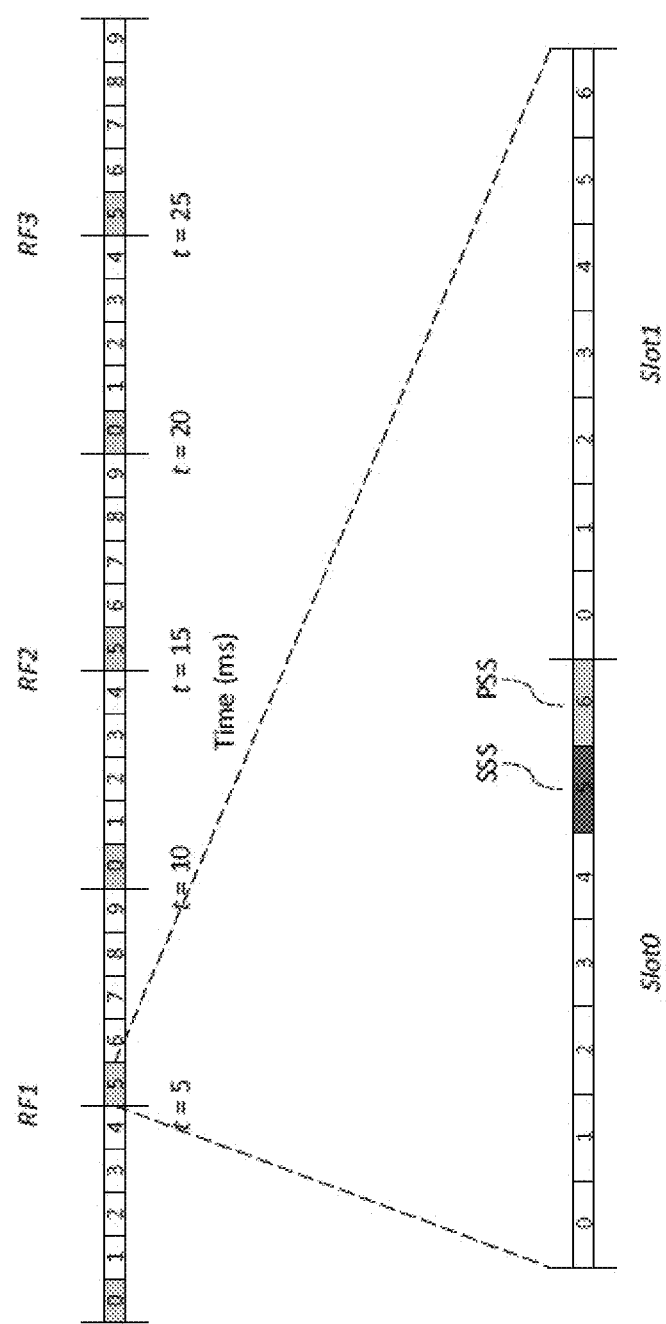
FIG. 4 shows a graphical depiction of an exemplary downlink transmission pattern of PSS and SSS sequences in FDD mode.

FIG. 4 shows a graphical depiction of the downlink transmission pattern of PSS and SSS sequences in FDD mode. As shown in FIG. 4, LTE cells may transmit downlink signals over a series of 10 ms radio frames, which radio frame is divided into 10 subframes each of 1 ms duration. Each subframe is divided two slots which each contain either 6 or 7 symbol periods depending on the Cyclic Prefix length. LTE cells may transmit a PSS sequence in the last symbol period of the first slot ($6^{th}$ or $7^{th}$ symbol period of the first slot depending on Cyclic Prefix length) and an SSS sequence in symbol period before the PSS, and may repeat this fixed symbol pattern over all radio frames.

Figure 5:
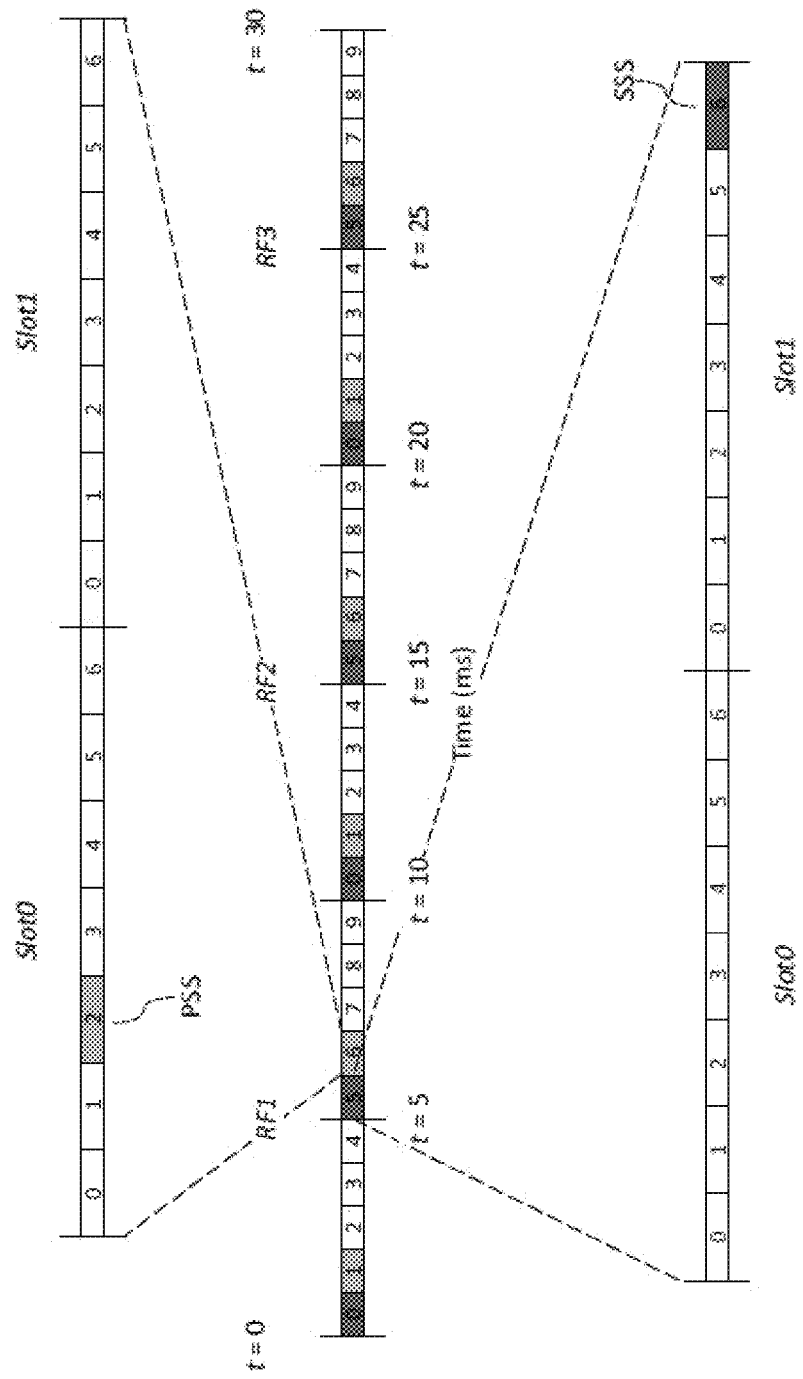
FIG. 5 shows a graphical depiction of an exemplary downlink transmission pattern of PSS and SSS sequences in TDD mode.

FIG. 5 shows a graphical depiction of the downlink transmission pattern of PSS and SSS sequences in TDD mode. As shown in FIG. 5, LTE cells may transmit a PSS sequence in the $3^{rd}$ symbol period of the first slot of the $1^{st}$ and $6^{th}$ subframes of each radio frame. LTE cells may then transmit an SSS sequence in the last symbol period of the second slot of the $0^{th}$ and $5^{th}$ subframes ($6^{th}$ or $7^{th}$ symbol period of the second slot depending on CP length). The separation in time between transmitted PSS and SSS sequences may thus vary as a function of both duplexing mode and CP length, which as further detailed below search engine circuit 306 may utilize to determine the duplexing mode and CP length of cells detected during cell search.

In accordance with the Orthogonal Frequency Division Multiplexing ("OFDM") scheme employed for downlink in LTE, each LTE cell may transmit downlink signals over a set of subcarriers, where each set of 12 contiguous subcarriers (spaced every 15 kHz) are grouped into a physical resource block. An LTE cell may transmit downlink signals over between 6 and 20 resource blocks (dependent on the particular system bandwidth), where each discrete subcarrier of the utilized resource blocks may transmit a single symbol (per symbol period).

As defined in Section 6.11 of 3GPP Technical Specification 36.211, "Physical channels and modulation", V12.5.0 ("3GPP TS 36.211"), each cell transmits a PSS and SSS sequence pair that identifies the PCI of the cell where the PSS sequence gives the physical-layer identity (ranging from 0 to 2) and the SSS sequence gives the physical-layer cell identity group (ranging from 0 to 167). Search engine circuit 306 may identify the PCI (ranging from 0 to 503) of a given cell by identifying the PSS and SSS sequence transmitted by the cell. Specifically, the PSS sequence index (out of the possible set of 3 predefined PSS sequences) may denote the physical-layer identity $N_{ID}^{(2)}$ while the SSS sequence index (out of the possible set of 168 predefined SSS sequences) may denote the physical-layer cell-identity group $N_{ID}^{(1)}$. The PCI $N_{ID}^{cell}$ may then be given as $N_{ID}^{cell}=3N_{ID}^{(1)}+N_{ID}^{(2)}$, thus allowing search engine circuit 306 to obtain the PCI of a cell by identifying the specific PSS and SSS sequence pair transmitted by the cell.

As further specified in Section 6.11 of 3GPP TS 36.211, each PSS sequence may be a 62-length sequence generated from a frequency-domain Zadoff-Chu root sequence that is mapped to one of the 62 central subcarriers (excluding a central DC subcarrier) of the system bandwidth during the aforementioned PSS symbol period. Each SSS sequence may be a 62-length sequence generated from a frequency-domain pseudorandom noise sequence that is similarly mapped to the 62 central subcarriers during the aforementioned SSS symbol period. Each of the 3 possible PSS sequences and 168 possible SSS sequences are predefined, and accordingly known at search engine circuit 306.

Accordingly, engine circuit 306 may compare locally-generated or locally-stored copies of the possible PSS and SSS sequences to the new search probe in order to determine whether the new search probe contains PSS and SSS sequences transmitted by detectable cells and, if so, determine the timing location of the PSS and SSS sequences in the new search probe. By identifying the presence and timing location of PSS and SSS sequences, search engine circuit 306 may determine the PCI of each detectable cell as well as obtain a timing reference to obtain synchronization with each detectable cell (i.e. by virtue of the fixed location in time of PSS and SSS sequences in the downlink transmission schedule of a cell).

Figure 6:
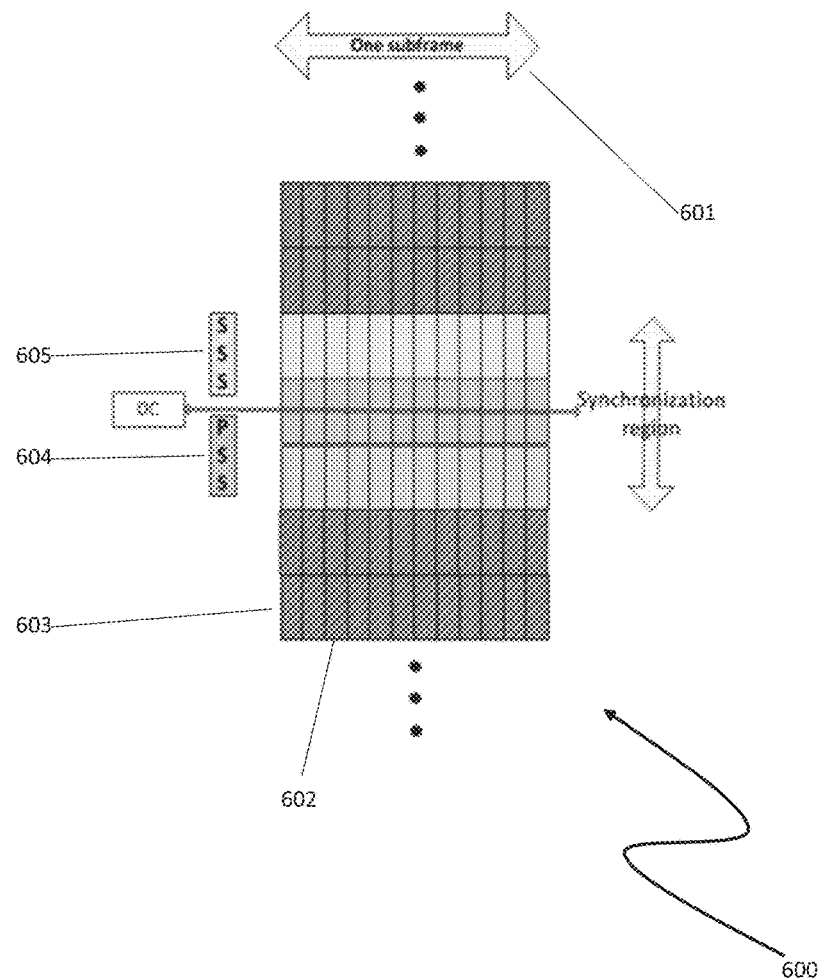
FIG. 6 shows a likely arrangement of an exemplary subframe within a 5G context.

FIG. 6 shows a likely arrangement of a subframe within a 5G context. Specifically, one subframe 601 of transmission is depicted with various channels, which, together, comprise a wireless transmission 600. As in LTE, the transmission 600 comprises OFDM symbols 602, which are transmitted over time along subcarriers 603. Various channels or sequences are arranged within the framework. FIG. 6 shows the placement of PSS 604 and SSS 605. Of particular note, in the emerging 5G standards, PSS and SSS do not occupy the same bandwidth, so in frequency-selective channels, PSS cannot be used to estimate the channel that SSS will observe.

According to one aspect of the Disclosure, the SSS in 5G is transmitted in symbol 0-13 in subframes 0 and 25 on antenna ports 313, . . . , 300=p. The same sequence is expected to be in all symbols. The sequence d(0), . . . , d(61) used for the second synchronization signal is an interleaved related connection of two length-31 binary sequences. The sequence is scrambled with a scrambling sequence given by the primary synchronization signal. The second synchronization signal is transmitted on antenna port p=300, . . . , 313.

As specified in Section 6.11.2 of 3GPP TS 36.211, each SSS sequence d(n) transmitted by a cell is an "interleaved concatenation of two length-31 binary sequences", denoted as d(2n) for the even-indexed sequence and d(2n+1) for the odd-indexed sequence to produce concatenated sequence d(n) defined for $0 \le n \le 61$. The interleaving sequences d(2n) and d(2n) are generated by applying scrambling sequences $c_0(n)$, $c_1(n)$, $z_1^{(m_0)}(n)$, and $z_1^{(m_1)}(n)$ to shifted base sequences $s_0^{(m_0)}(n)$ and $s_1^{(m_1)}(n)$ as follows:

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad (1)$$

-continued
$$d(2n+1) = \begin{cases} s_1^{(m_1)}(n)c_0(n)z_1^{(m_0)}(n) & \text{in subframe 0} \\ s_0^{(m_0)}(n)c_1(n)z_1^{(m_1)}(n) & \text{in subframe 5} \end{cases}$$

where $0 \le n \le 30$. As defined in Section 6.11.2.1 of 3GPP TS 36.211, scrambling sequences $c_0(n)$ and $c_1(n)$ are sequences of $\pm 1$ dependent on PSS sequence index $N_{ID}^{(2)}$ and scrambling sequences $z_1^{(m_0)}(n)$ and $z_1^{(m_1)}(n)$ are similarly sequences of $\pm 1$ dependent on SSS sequence index $N_{ID}^{(2)}$ (by way of cyclic shifts $m_0$ and $m_1$ as detailed regarding FIG. 7).

The shifted base sequences $s_0^{(m_0)}(n)$ and $s_1^{(m_1)}(n)$ used to generate d(n) are defined as two different cyclic shifts of base sequence $\tilde{s}(n)$ according to $$s_0^{(m_0)}(n) = \tilde{s}((n+m_0) \bmod 31)$$

$$s_1^{(m_1)}(n) = \tilde{s}((n+m_1) \bmod 31) \quad (2)$$

where $\tilde{s}(i) = 1 - 2x(i)$, $0 \le i \le 30$, is defined by $$x(\tilde{i}+5) = (x(\tilde{i}+2) + x(\tilde{i})) \bmod 2, \ 0 \le \tilde{i} \le 25 \quad (3)$$

with initial conditions x(0)=0, x(1)=0, x(2)=0, x(3)=0, and x(4)=1.

The cyclic shifts $m_0$ and $m_1$ applied to $\tilde{s}(n)$ are defined according to the SSS sequence index $N_{ID}^{(1)}$ (physical-layer cell-identity group), which as previously detailed, specifies the PCI $N_{ID}^{cell}$ along with the PSS sequence index $N_{ID}^{(2)}$ (physical-layer identity within the physical-layer cell identity group).

Accordingly, each cell may generate and transmit an SSS sequence d(n) during a single symbol period per half-frame (where d(n) may alternate between two different SSS sequences each half-frame according to Equation (1) that both correspond to the SSS sequence index $N_{ID}^{(1)}$ (physical-layer cell-identity group) of the cell), where the 62 symbols of SSS sequence d(n) may be mapped to the central 62 subcarriers (excluding the DC subcarrier) of the system bandwidth as specified in Section 6.11.2.2 of 3GPP TS 36.211. As previously indicated, search engine circuit 306 may employ the prior placement in time of the PSS sequence (as shown in FIGS. 4 through 6) to perform channel equalization and obtain symbol-timing boundaries, thus allowing search engine circuit 306 to convert each identified SSS symbol period of the captured half-frame to the frequency domain and thus obtain detected length-62 SSS symbol vector r. Search engine circuit 306 may identify candidate cells by comparing each detected SSS symbol vector r to the possible set of 168 SSS sequences to identify a local predefined SSS symbol vector d (if any) that sufficiently matches detected SSS symbol vector r, e.g. on the basis of a cross-correlation peak of sufficient amplitude.

Search engine circuit 306 may retrieve the detected SSS vector r and the corresponding local SSS vector d (that triggered a match with r during SSS detection in 404) in 406. Search engine circuit 306 may then demodulate detected SSS vector r with local SSS vector d to obtain demodulated SSS vector p. As equivalently defined above in Equations (1)-(3), local SSS vector d may be a length-62 vector $d=(d_1, \ldots, d_{N-1})$ with N=62 where $s_i \in \{-1, +1\}$ for $0 \le i \le N-1$. In other words, local SSS vector d may be a pseudorandom sequence of -1 and +1 symbols, where d is generated from shifted base sequences $s_0^{(m_0)}(n)$ and $s_1^{(m_1)}(n)$ according to Equation (1). Search engine circuit 306 may receive the originally transmitted d in the form of detected SSS symbol vector $r=(r_0, r_1, \ldots, r_{N-1})$ with N=62 where $r_i \in \mathbb{C}$ for $0 \le i \le N-1$.

Figure 7:
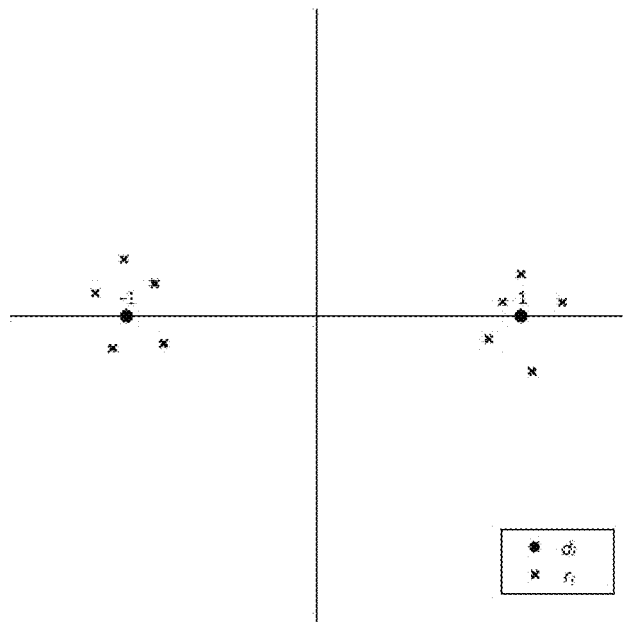
FIG. 7 shows an example of noisy synchronization sequence demodulation on a complex plane.

While the corresponding cell may transmit d with $d_i \in \{-1, +1\}$, i.e. symbols of either −1 or +1, search engine circuit 306 may receive d in the form of detected symbol vector r with $r_i \in \mathbb{C}$, i.e. complex-valued symbols. In other words, wireless transmission and local processing at mobile terminal 102 may distort the original −1 and +1 symbols of d to other symbols in the complex plane, thus yielding detected SSS symbol vector r. FIG. 7 shows a basic example in which originally transmitted SSS symbols $d_i \in \{-1, +1\}$ are translated from the real-valued (−1,0) and (+1,0) positions on the real axis to complex-valued symbols $r_i \in \mathbb{C}$. As shown in FIG. 7, the originally transmitted/local predefined SSS symbols of d may thus be exclusively limited to real symbols with phase of 0 or π radian (0 or 180 degrees) while the detected symbols of r may contain both real and imaginary components and exhibit any phase (depending on the aforementioned noise and other imperfections).

Once received, there are predominately two method for detection of SSS: CD and NCD. CD utilizes the PSS as a pilot to estimate the channel phase, and this estimated phase is then used to correct the phase of the received SSS, such that multiple observations of the signal can be combined coherently. NCD, on the other hand, does not perform channel correction, but rather combines multiple observations non-coherently. This results in degraded performance as compared to CD. FIG. 8 shows a comparison of CD and NCD 801, wherein the performance of CD is represented by 802 and the performance of NCD is represented by 803.

As shown in FIG. 6, and in contrast to LTE, the PSS and SSS in 5G do not occupy the same bandwidth, and therefore it cannot be assumed that the channel remains static between PSS and SSS. Moreover, because PSS and SSS do not use the same bandwidth, PSS cannot be used to estimate the channel that SSS will observe in frequency-selective channels. In light of these characteristics of 5G, and particularly in light of the inability to assume a similarity of channel between PSS and SSS, attempts at using known methods of CD for channel detection may not yield acceptable results.

Nevertheless, a signal characteristic of SSS can be exploited to improve detection over NCD, such that the results approach those of CD in LTE, TDD, and 5G while resulting in silicon area savings. One of the most complex and computationally costly components of the searching process is the M-Sequence Correlator. In CD, the signals from the receive antennas can be coherently combined into a single real-values signal, and since they can be combined into a single real-values signal with no complex values portion, they only require one M-Sequence Transform. In contrast, however, the NCD method uses signals that comprise both real and complex values. This requires that a separate M-Sequence transform be performed for the real and complex portions of each antenna.

Figure 9:
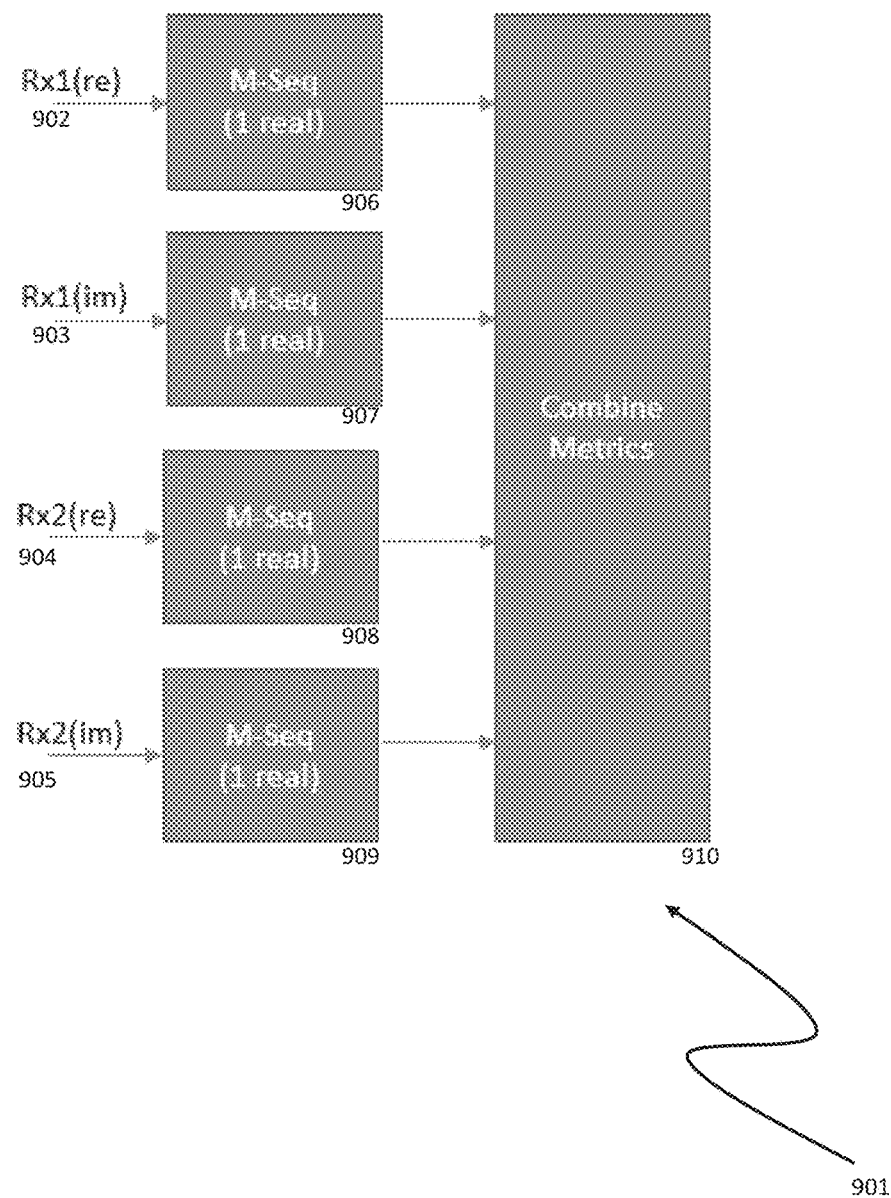
FIG. 9 shows an exemplary method of Non-Coherent Detection ("NCD")

FIG. 9 shows a method for NCD of SSS 901. In this simple example, receive antenna one 902 and 903 comprises a real portion 902 and an imaginary portion 903. Receive antenna two 904 and 905 comprises a real portion 904 and an imaginary portion 905. Each of these signal portions is processed through an M-Sequence correlator, as shown in 906, 907, 908, and 909, respectively. The M-Sequence Correlators output signals that can be combined through combination metrics 910. It should be noted that, although two receive antennas are commonly used in current practice, it is anticipated that the number of receive antennas will increase in 5G and future RAT. In 5G implementations, for example, it may be commonplace to use four or more antennas. Regardless of the number of antennas, this method of SSS correlation can be used.

FIG. 10, in contrast, shows a CD method for detection of SSS 1001. As with the prior figure, signals are received by receive antenna one 1002 and receive antenna two 1003. Each antenna receives a real and an imaginary signal. For each antenna, the signal undergoes a channel estimation 1004 and the phase is estimated 1005. Once the channel and phase are estimated, then signal undergoes a channel correction 1006, which yield a real signal. The real signals of the two antennas can be combined following channel correction. Because the signals can be combined prior to the M-Sequence Correlation 1007, only one M-Sequence Correlation is needed. Following the M-Sequence Correlation, the resulting data can be combined in the combine metrics 1008. This method permits fewer M-Sequence Correlations, which results in an overall savings of silicon space.

Because of the likely location of PSS and SSS in 5G, and because of the inability to assume a constant channel in fast-fading frequencies, CD may be unavailable. Although NCD methods are possible, they demand significant computational resources, owing to the two M-Sequence correlators used per receive antenna. Since the M-Sequence Correlators are the most computationally demanding aspect of the detection, it is advantageous to reduce the number of M-Sequence Correlations that must be performed, where a comparable or better result could be obtained with the need for fewer processing resources.

The underlying principle is to exploit SSS signal properties to improve misdetection performance and reduce silicone area of the SSS detector. It is specifically contemplated that this method can be used in 5G technology; however, this is not intended as a limitation, and it is further expressly contemplated that this method can be used in an RAT employing a BPSK, or a signal with similar properties, as will be described in greater detail herein.

According to one aspect of the disclosure, the disclosure leverages the BPSK modulated signal characteristics of the secondary synchronization signal in LTE and 5G to phase correct the received SSS. For a BPSK modulated signal converted to frequency domain, two possible positions in the complex plane exist. Without loss of generativity, this can be thought of as a±1 on the complex plane. Assuming that a flat-fading channel introduces a phase offset α, then one of the possible constellation points is located at angle α. The second possible point resides at angle α+180°. For a 4QAM, four or more possible positions exist in the complex plane. Modulation is not fully removed in 4QAM as it is in BPSK with squaring.

FIG. 11 shows the phase offset angle α and a method of addressing α using a squaring technique 1101. The squaring operation for BPSK 1102 shows a Constellation Diagram with Quadrature Axis ("Q-Axis") 1103 and In-Phase Axis ("I-Axis") 1104. In this diagram, phase offset angle α 1105 shows a rotation of a constellation point caused by phase introduced by the channel. Alternatively, because α is calculated from a transmission sample where the beginning and end of the subframe has not yet been calculated, the constellation point may also be β 1106, which is calculated as 180+α.

According to an aspect of the Disclosure, the SSS BPSK signal undergoes an element-wise squaring operation. This element-wise squaring operation removes the modulation. The element-wise squaring further results in a doubling of α. In the case of a BPSK transmission, this results in a single point, where 2α=2β 1107. In a 4QAM scenario 1108, the signal undergoes a phase shift angle α can appear in four positions on a complex plane, either as α 1109, α+180 1110, α+90 1111, or α+270 1112. The squaring operation results in a doubling of α, but because of phase ambiguity, 2α can be either 2α 1113 or 2α+180 1114. Thus, the modulation is not fully removed by squaring in 4QAM as it is in BPSK.

Figure 12:
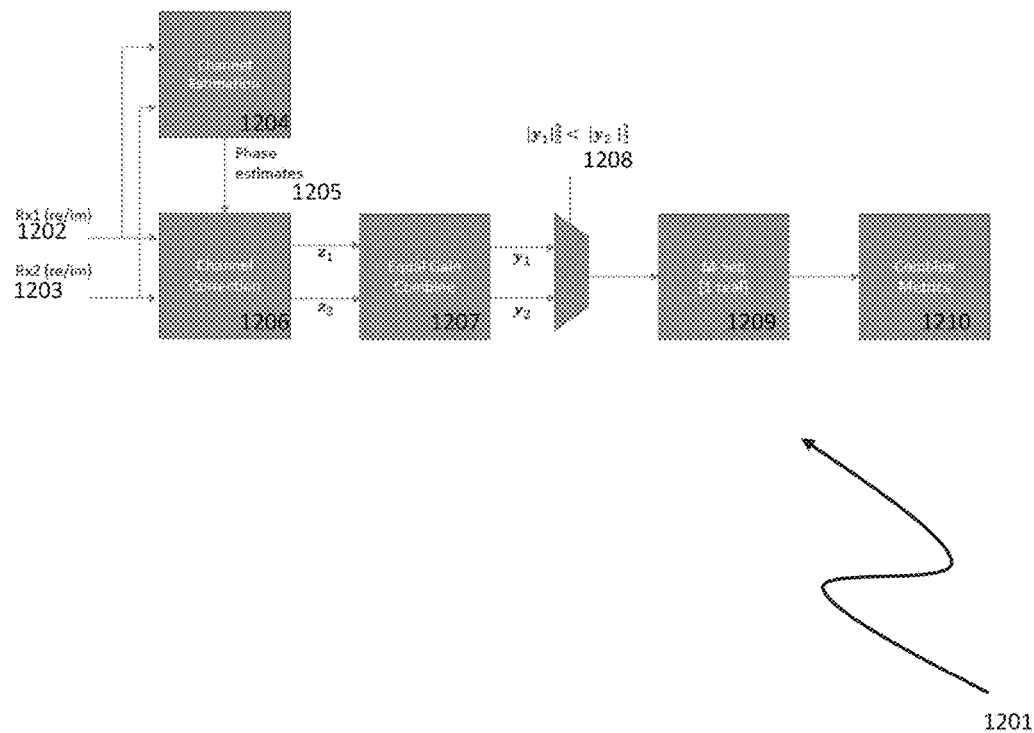
FIG. 12 shows an exemplary method of synchronization signal detection.

FIG. 12 shows a process for detecting a SSS 1201, with two receive antennas, receive antenna 1 1202 and receive antenna 2 1203. The received signals from each receive antenna feed into the Channel Estimation 1204 circuit where a channel estimation is performed and a phase estimate for phase α 1205 is calculated for each. The channel of each received signal results in a phase, and the channel estimation block estimates the phase by which the channel is affecting the signal. With a channel estimate and phase estimate available, the signals from receive antenna 1 1202 and receive antenna 2 1203 are also fed into a Channel Correction circuit 1206, where the received signals are corrected for channel. Because the phase manifests as a signal rotation, the signal undergoes an element-wise rotation by the estimated phase (rotation by −α) to correct for the phase rotation. Upon completion of channel and phase correction, the corrected signal is outputted as $z_1$ and $z_2$, where:

$$z_1 = \pm |h_1| s \text{ and} \quad (4)$$

$$z_2 = \pm |h_2| s \quad (5)$$

and, where $h_1$ and $h_2$ are the channels associated with receive antenna 1 1202 and receive antenna 2 1203, respectively. The plus/minus functions result from the 180-degree phase ambiguity that results from the squaring operation, whereby negative terms become positive when squared. An equal gain combine function 1207 is then performed on $z_1$ and $z_2$, where they are constructively and destructively combined and are output as a function of y, where $$y_1 = z_1 + z_2 \text{ and} \quad (6)$$

$$y_2 = z_1 - z_2 \quad (7)$$

represent the combined channels. Depending on the channel realization, one term will have the signal constituents $$\pm(|h_1| + |h_2|)s \quad (8)$$

and the other will have the signal constituents $$\pm(|h_1| - |h_2|)s \quad (9)$$

resulting from constructive and destructive equal gain combining. The y term with the largest Euclidian norm is then selected by the comparison switch 1208, as:

$$|y_1|_2^2 < |y_2|_2^2 \quad (10)$$

and a single M-Sequence Correlation is performed on that term 1209. The resulting output with the greatest correlation coefficient is used for cell detection. This output then undergoes a combine metrics 1210 stage, where the candidates for PSS and SSS are re-evaluated in light of one another to determine the correct cell synchronization signals.

An alternative method is to omit the determination of the largest Euclidian norm by the comparison switch 1208 and instead proceed directly to an M-Sequence Correlation for both $y_1$ and $y_2$. In that event, the outputs from the M-Sequence Correlator are then evaluated. The constructive metric as described in Eq. 10 will be the largest and will be used after M-Sequence Correlation for cell detection.

Figure 13:
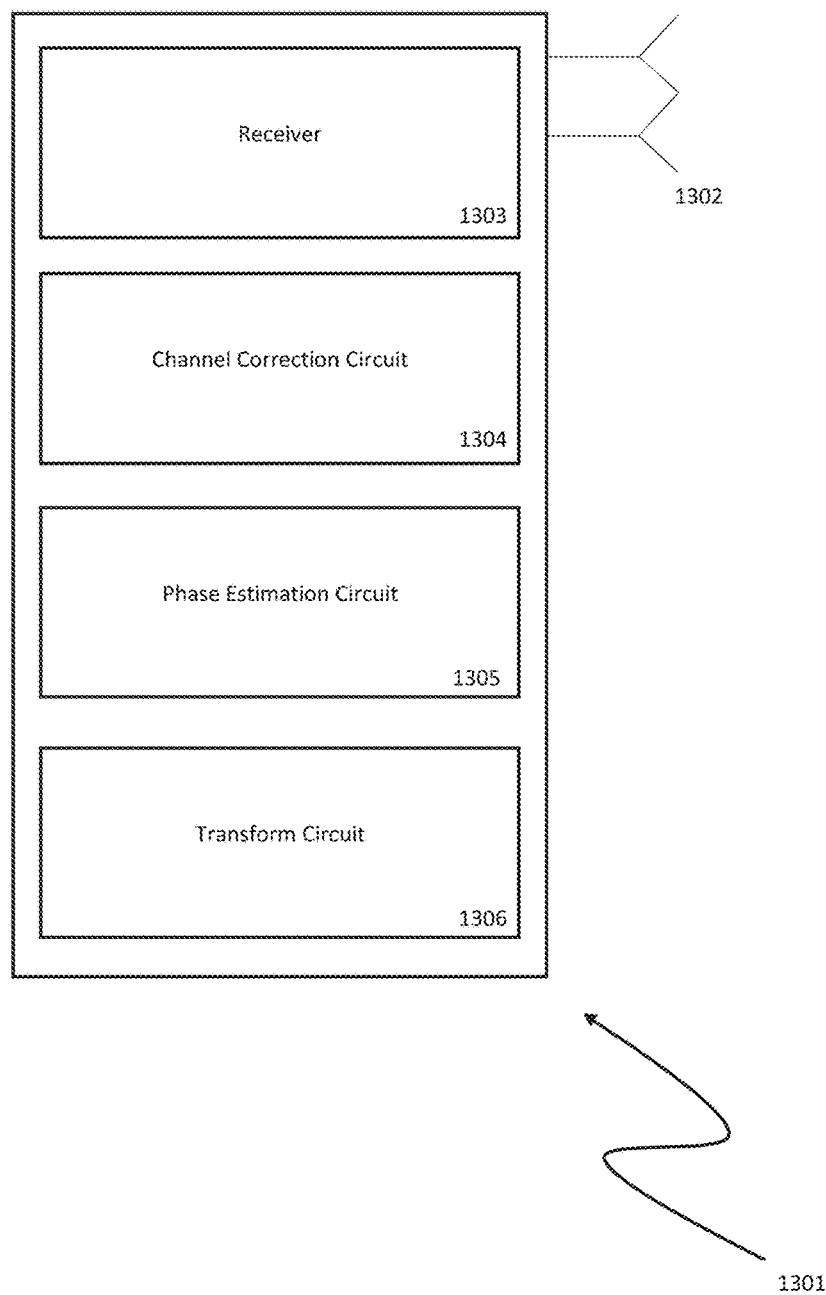
FIG. 13 shows an exemplary circuit configuration or apparatus for synchronization signal detection.

FIG. 13 shows a circuit configuration for SSS detection 1301, comprising one or more receive antennas 1302, configured to receive a wireless communication from a transmitting antenna; a receiver 1303, configured to receive and process the wireless transmission from the one or more antennas; a channel correction circuit 1304, configured to estimate and correct for a channel by performing element-wise squaring of a received signal; a phase estimation circuit 1305, configured to calculate a phase for a wireless transmission as received by a receive antenna; and a transform circuit 1306, configured to perform an M-Sequence Transform and, as necessary, calculate a largest Euclidian distance of they terms or calculate a greatest magnitude of output from the M-Sequence Transform.

FIG. 14 shows a comparison between CD and the method described herein 1401 as performed in channel EPA70, where the results of CD are shown at 1402 and the results of the method described herein are shown at 1403.

FIG. 15 shows a comparison between CD and the method described herein 1501 as performed in channel EVA70, where the results of CD are shown at 1502 and the results of the method described herein are shown at 1503.

FIG. 16 shows a comparison between CD and the method described herein 1601 as performed in channel ETU30, where the results of CD are shown at 1602 and the results of the method described herein are shown at 1603.

FIG. 17 shows various references to Matlab code, which are being provided for illustrative purposes. This figure includes same code for estimating the channel phase 1701, compensation of channel data with receive antenna combining 1702, checking that the sequences are channel adjusted 1703, generating receive SSS data 1704 and removing BPSK modulation 1705.

Figure 18:
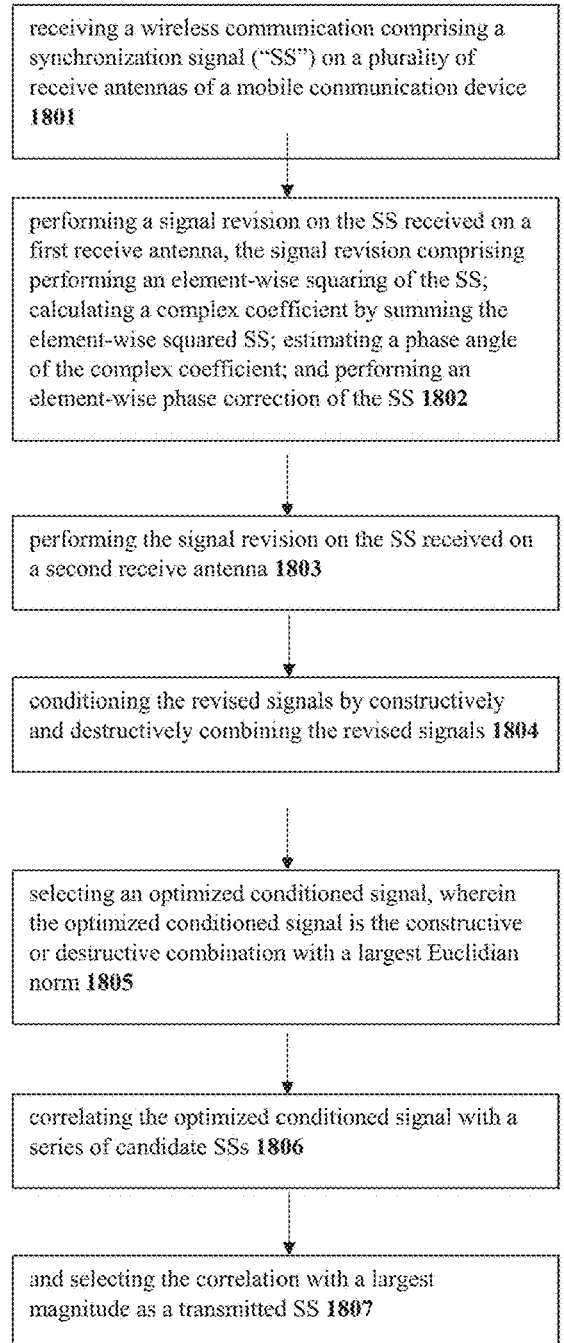
FIG. 18 shows a first exemplary method for leveraging secondary synchronization signal properties to improve synchronization signal detection.

FIG. 18 shows a first method for synchronization signal correlation, comprising receiving a wireless communication comprising a synchronization signal on a plurality of receive antennas of a mobile communication device 1801; revising a first synchronization signal received on a first receive antenna 1802; revising a second synchronization signal received on a second receive antenna 1803; conditioning the first and second revised signals by constructively and destructively combining the first and second revised signals 1804; selecting an optimized conditioned signal from the conditioned first and second revised signals 1805; correlating the optimized conditioned signal with a series of candidate synchronization signals 1806; and selecting the correlation with a largest magnitude as a transmitted synchronization signal 1807.

Figure 19:
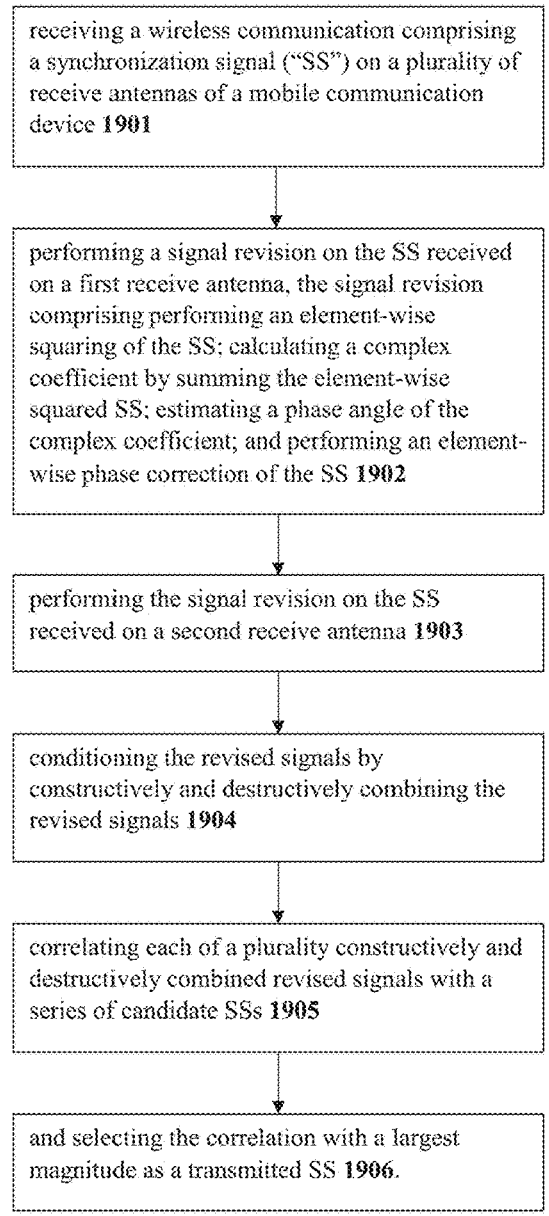
FIG. 19 shows a second exemplary method for leveraging secondary synchronization signal properties to improve synchronization signal detection.

FIG. 19 shows a method of synchronization signal correlation, comprising receiving a wireless communication comprising a synchronization signal on a plurality of receive antennas of a mobile communication device 1901; performing a signal revision on the synchronization signal received on a first receive antenna 1902; performing the signal revision on the synchronization signal received on a second receive antenna 1903; conditioning the revised signals by constructively and destructively combining the revised signals 1904; correlating each of a plurality constructively and destructively combined revised signals with a series of candidate synchronization signals 1905; and selecting the correlation with a largest magnitude as a transmitted synchronization signal 1906.

According to one aspect of the disclosure, the initial processing steps required for estimation of the phase shift are (1) element-wise squaring a sixty-two element SSS BPSK modulated signal in the frequency domain for receive antenna 1; (2) summing the product of the squares to obtain a complex coefficient; (3) estimating the phase angle of the complex coefficient, i.e. estimating 2α; (4) element-wise phase correcting the received 62 element SSS BPSK modulated signal by $-\alpha$; (5) repeating the procedure for receive antenna 2. This procedure yields the products:

$$z_1 = \pm |h_1| s \quad (11)$$

and $$z_2 = \pm |h_2| s \quad (12)$$

for receive antenna 1 and receive antenna 2, respectively. The 180 degree ambiguity is introduced as a result of the squaring operation, which may result in aliasing the phase.

It is cautioned that equations 11 and 12, above, have been presented for purposes of convenience without a noise term. It is understood that each received SSS transmissions will comprise noise. The formulas above are not intended to discount the importance of the noise, but are rather presented to simplify the method presented herein.

5G standards are currently in development, and there is currently no single, approved set of standards for 5G communications related to PSS and SSS. Nevertheless, there are trajectories within 5G standards, some of which relate specifically to PSS and SSS signals. Although there is significant overlap between LTE and 5G, there are meaningful differences that affect cell search and synchronization. Of note, in 5G, the PSS signals and SSS signals are likely to no longer occupy the same frequency resources and are generally offset in the frequency domain. This configuration presents a situation similar to TDD systems, where the PSS cannot be reused for channel estimation. This prevents implementation of a true CD method.

Although a NCD method would be possible under this signal configuration, there is a performance gap between CD and NCD, and it is desirable to find a method that reaches or approximates the performance level of CD, even where CD would not otherwise be possible. One method of achieving this aim is to use the properties of the SSS sequence to perform a channel estimation and then to correct the SSS sequence.

By exploiting various signal properties of the SSS sequence, it is possible to perform a partial channel estimation, which permits the coherent addition of the SSS sequences as they arrive, while suppressing the noise.

For SSS cell searches, there are generally two approaches: (1) CD and (2) NCD. CD generally uses a PSS sequence as a pilot for channel estimation. Because, in LTE, the PSS and SSS sequences are on the same bandwidth, occupy the same subcarriers and frequency resources, and are closely spaced in time, a static channel after estimation of the PSS sequence can be assumed. For NCD, which is historically more typical for TDD systems, the PSS and SSS are farther apart, and in fast-fading channels, or high mobility channels, the channel can change even within a few OFDM symbols. As such, it is impractical in these systems to use PSS channel estimation to then correct the SSS.

The SSS is a Binary Phase Shift Keying ("BPSK") signal and thus conveys data by modulating the phase of a carrier wave. Although BPSK is subject to channel and phase offsets, a known aspect of BPSK is that the carrier frequency can be recovered by squaring the received BPSK signal. According to an aspect of the Disclosure, the received SSS signal, being a BPSK signal, is element-wise squared, which results in a signal that is twice the carrier frequency with no phase modulation. The squaring operation, however, results in a 180 degree phase ambiguity, which can be represented as ±1 on a complex plane. The resulting phase ambiguity results from the mathematical consequences of squaring, whereby, in a set of comprised of −1 and 1, both terms will become 1 after squaring.

Once the phase ambiguity is resolved through the squaring operation, the phase angle may be calculated. As shown in FIG. 11, the phase angle, $\alpha$, can be considered an angle of phase rotation of the SSS transmission. Whereas it was challenging to discern before squaring whether the phase angle was truly $\alpha$ or $\beta$ (where $\beta = \alpha + 180°$), the squaring operation in the BPSK context identifies the phase, after squaring, of $2\alpha$, from which $\alpha$ can then be calculated.

The SSS comprises 62 elements, each of which will be squared element-wise. This results in a matrix of 62 squared terms. Once the squaring is complete, the terms can be added together to obtain a complex number, which contains a phase. Since the phase angle $\alpha$ becomes doubled in the squaring process, the resulting phase term for this complex number is $2\alpha$. A complex number is then generated that is half $2\alpha$, or otherwise $\alpha$. A $-\alpha$ is then applied to the to the sequence to correct for the phase. The resulting terms are essentially a conjugate of the channel. Therefore, the channel can be corrected by multiplying the channel conjugate with the original, non-squared terms. The resulting signal is corrected for channel and phase, but contains a phase ambiguity of 180 degrees, due to the squaring operation. From this point, the results are constructively and destructively combined and the largest Euclidian distance calculated, which allows for the term without phase ambiguity to be identified.

Each receive antenna receives a signal comprising a channel and a phase shift. According to an aspect of the Disclosure, it can be assumed that the channel for each receive antenna is a flat-fading channel, based on the relatively narrow bandwidth on which the SSS is transmitted. The flat-fading channel is modeled with a single tap, and therefore each symbol is rotated by a single channel, which results in a phase rotation of the SSS signal. Thus, correcting for the phase requires that the phase be estimated and the signal rotated by the phase angle.

The phase shift can be thought of as a signal rotation, as presented on a two-dimensional IQ plane. The phase angle, $\alpha$, is the angle of signal rotation due to phase. In the process of channel estimation, whereby the received BPSK signals are element-wise squared, angle $\alpha$ is effectively doubled, whereby the phase shift of the squared data is $2\alpha$. In solving for $\alpha$, the phase shift can be obtained, and the signal is then rotated to correct for the phase shift.

This phase correction operation will be performed for each receive antenna, such that, at the completion of phase correction, such that the SSS received by each receive antenna will be a phase corrected, real signal.

The phase ambiguity results from the prospect that a phase sequence may be rotated 180 degrees in the element-wise squaring process. The constructive and destructive combination is designed to remove the phase ambiguity, even if the resulting plus or minus sign may be incorrect. Assuming two receive antennas where the squared signal equals 1, the results of the constructive and destructive combinations are −1−1, +1+1, −1+1, or +1−1. From this juncture, the Euclidian norm of each combination can be calculated. The combination with the largest Euclidian norm will be the correct combination, and it will need to be processed with the M-Sequence Correlator.

The constructive and destructive combinations involve combining signals from different antennas, which necessitates phase correction before the combination occurs. Thus, in the case of two receive antennas, the signals are corrected for phase, as described above, and then combined before being submitted for an M-Sequence Correlation. As stated above, the phase-corrected signals are both constructively and destructively combined. Because of the sign ambiguity associated with the h matrix channel, the constructive and destructive combination of the phase-corrected signals results in four combinations, in the case of two receive antennas. In the event that more receive antennas are used, there would be a correspondingly larger number of combined signals. This is due to the exponential growth of constructive and destructive combinations as additional antennas are added. Whereas only four combinations are possible with two receive antennas (essentially $--$, $-+$, $+-$, $++$), additional receive antennas result in a greater number of constructive and destructive combinations. Once each of the signals are combined, two methods for submitting signals for an M-Sequence Correlation are contemplated.

According to one aspect of the Disclosure, each of the combined signals can be submitted to the M-Sequence Correlator. The M-Sequence Correlator's output will resemble a dot product of the combined signal and each of the candidate SSS signals. This dot product output shows a correlation between the combined signal and each of the candidate SSS signals. Therefore, in the case of two receive antennas, and operating under this method, four combined signals are input into the M-Sequence Correlator, and four constructive metrics are output from the M-Sequence Correlator. Each of the constructive metrics must then be evaluated for magnitude. The constructive matrix with the greatest magnitude is used for M-sequence cell detection.

According to a second aspect of the Disclosure, each of the combined signals are assessed before proceeding with the M-Sequence Correlation, such that only the combined signal that corresponds to the correct signs, in light of the sign ambiguities, is sent to the M-Sequence Correlator. In this case, the combined signals, referred to as y in equations (6) and (7), above, are assessed for the greatest Euclidian distance according to $|y_1|_2^2 < |y_2|_2^2$. Once the largest Euclidian distance of the combined y signals is determined, only that corresponding signal is submitted to the M-Sequence Correlator.

Because the M-Sequence Correlator's calculations are computationally more complex than determining the largest Euclidian distance, this method results in computational savings by computing the Euclidian distance in lieu of multiple evaluations by the M-Sequence Correlator. Moreover, this method of obtaining the largest Euclidian distance results in computational savings over NCD, since NCD for a two-receive-antenna system requires separate M-Sequence Correlations of the real and imaginary portions of the signals for each of the receive antennas. In the case of two receive antennas, a typical NCD method requires four M-Sequence Correlations, whereas the method described herein can achieve a comparable result with a single M-Sequence Correlation.

The result of the M-Sequence Transform is the output of a single real-values signal. The output is a matrix of real values, which can then be used for cell detection. Although various methods of M-Sequence Transforms are available, and according to one aspect of the Disclosure, the M-Sequence Transform performs a Fast Hadamard Transform. The Fast Hadamard Transform is selected because of its simplicity when compared with a standard Walsh-Hadamard Transform, which is common in NCD. Nevertheless, the Fast-Hadamard transform is a computationally complex process that requires significant silicone space. Although the fast-Hadamard transform is, itself, a simpler and less computationally demanding version of the Complex-Hadamard-Transform or Walsh-Hadamard Transform, it requires significant computational resources. The fast-Hadamard transform requires n log n operations ($n=2^m$) and for a 2×2 matrix may be processed as follows:

$$H_N = \left(\frac{1}{\sqrt{2}}\right)\begin{pmatrix} H_{N-1} & H_{N-1} \\ H_{N-1} & -H_{N-1} \end{pmatrix} \quad (13)$$

Depending on the channel realization, one term will have the signal constituents $\pm(|h_1|+|h_2|)s$, and the other will have the signal constitutiants $\pm(|h_1|-|h_2|)s$, which is indicative of constructive and destructive equal gain combining. The results will be subjected to M-Sequence Correlation. Once the M-Sequence Correlation is complete, the constructive metric will be the largest output and can be used for cell detection. Alternatively, rather than performing multiple M-Sequence Correlation, they value with the largest Euclidian norm can be selected, and a single M-Sequence Correlation can be performed on that value. Because determining the largest Euclidian norm for these values is significantly simpler than an M-Sequence transform, this alternative method may further save silicon space and computational resources.

In the event that a single M-Sequence Correlation is performed to the y term with the greatest Euclidian distance, or in the event that multiple M-Sequence Correlations are performed and the largest result is selected, either procedure will result in a single output for decoding. The received sequence is then decoded with this output to reveal a received signal. In this phase, the decoded received signal is compared against an array of possible SSS sequences. The M-Sequence Correlator calculates a dot product of the M-Sequence Transform matrix and the various SSS sequences to produce a correlation coefficient.

The correlation coefficient provides the similarity between the decoded received signal and the potential variations of SSS. The correlation coefficient ranges from −1 to 1, ranging from strongly negatively correlated to strongly positively correlated, where zero means that the signals show no correlation.

In the LTE context, there are 504 unique physical-layer cell identities, where the physical-layer cell identities are ground into 168 unique physical-layer cell-identity groups, wherein each group comprises three unique identities. The grouping is such that each physical-layer cell identity is part of one and only one physical-layer cell-identity group. I physical-layer cell identity is uniquely defined by a physical-layer cell identity group having a number in the range of 0 to 167, and a physical-layer identity within the physical-layer identity group having a range of 0 to 2. The SSS is a sequence represented by d(0), . . . , d(61), which is an interleaved concatenation of two length-31 binary sequences. The M-Sequence correlator will compare the decoded M-Sequence with the possibilities for SSS codes and will produce a dot product that functions as a correlation coefficient for each of the results. The correlation coefficient with the greatest magnitude, whether negative or positive, is used for cell detection.

In the event that the number of SSS or physical-layer cell identity possibilities differs in future RAT, it is anticipated that this method can be used in said RAT regardless of the number of potential SSS codes. It is expressly contemplated that the method(s) described herein may be performed with RATs, including 5G, or otherwise. It is conceivable that in future RATs, Secondary Synchronization Signal may not be the given name for a synchronization that performs the same, or a substantially similar function, as the SSS. Nevertheless, it is anticipated that the method(s) described herein can be used with future implementations of SSS or other synchronization signals.

The potential SSS signal with the strongest positive or negative correlation is selected as the candidate SSS signal. According to one aspect of the Disclosure, one of the potential SSS signals will have a significantly greater positive or negative correlation than the others, and this strength in correlation indicates that the corresponding potential SSS signal is the signal that was translated. A strong positive correlation suggests identity or substantial similarity between the decoded SSS signal and the transmitted SSS signal. The strong negative correlation suggests that the decoded SSS signal has reversed positive and negative signs, which results from the initial phase ambiguity. Where the strongest correlation is a negative correlation, the transmitted SSS signal will comprise data substantially similar to the decoded signal, except that the positive and negative signs will be largely reversed.

The method(s) described herein may be repeated for each of a plurality of Secondary Search Signal hypotheses. The frequency of repeating is implementation specific and can be programed or adjusted to meet the demands of a given implementation.

According to another aspect of the Disclosure, each result from the constructive and destructive combination can be processed by the M-Sequence Correlator without seeking a Euclidian norm. The M-Sequence Correlator will output a correlation value. The correlation values must then be compared. The largest correlation value, irrespective of the sign, is then selected for channel decoding.

According to another aspect of the Disclosure, and in the event that only one receive antenna is present or operational, the constructive and destructive combining step can be omitted. Under those circumstances, there will only be one z term, $z_1$, which then must be processed through the Fast Hadamard Transform. The Fast Hadamard Transform outputs two matrices, based on the sign ambiguity in the corresponding $h_1$ term. Of these two matrices, the matrix with the largest magnitude is selected for the channel decoding.

The magnitude of the benefit may increase as the number of receive antennas increases. In most current wireless communication implementations, such as in LTE, it is common to use two receive antennas. As data demands for wireless communication increase, so too may the number of receive antennas increase. It is conceivable that 5G devices may routinely employ four or more receive antennas. In an implementation with four receive antennas, a NCD application would require an M-Sequence Transform for the real and complex portions of each of the receive antennas, which would result in eight fast-Hadamard transforms.

According to one aspect of the Disclosure, this method permits a beneficial trade-off, where overall computational complexity is reduced at the expense of computational duration. In NCD, for example, each real and imaginary signal from each receive antenna must undergo its own fast-Hadamard transform. In NCD, these transforms can be performed in parallel, or in effect, simultaneously, which requires significant computational resources. In this method, however, the number of fast-Hadamard transforms is reduced, which also leads to a reduction in computational resources; however, since some of the steps must be performed in series, this may result in an increase in processing time. This is an acceptable, or even desirable, tradeoff in many circumstances, such as where there is a need to decrease silicone area, or to free silicone resources for other operations.

According to one aspect of the Disclosure, the methods herein transform the SSS into a real number and therefore reduce the number of fast-Hadamard transforms necessary to process the code. Where a signal comprises both real and imaginary portions, the real and imaginary portions must typically be separated and a fast-Hadamard transform performed on each of them. In the case of the SSS, however, although the SSS comprises imaginary portions, the SSS is fundamentally a real signal, plus or minus one for every BPSK modulation. By squaring the SSS and performing the channel correction, the imaginary portions are eliminated and the SSS becomes a real signal, which, in turn, obviates the need to perform a fast-Hadamard transform on the imaginary portions. Therefore, the SSS signal only requires a single fast-Hadamard transform.

In viewing FIGS. 14-16, there is a significant savings in expensive M-Sequence Transform operations. This translates into power savings and potentially area savings. Using the estimated phase information, as described in this Disclosure, significantly improves detection performance over NCD and nearly matches the performance of CD.

Throughout this Disclosure, the term SSS has been used. This term is selected in light of the current standards for Secondary Synchronization Signals. Secondary Synchronization Signals is a term of art for a signal that is currently in use in LTE, and which is likely to be used in 5G. That notwithstanding, it is expressly anticipated that future RATs may use synchronization signals with alternative names, or that small changes in the synchronization process will result in changes to the synchronization signal names. To the extent that future RATs employ names other than Secondary Synchronization Signal, it is expressly stated that this Disclosure is anticipated to operate with alternative names and configurations of synchronization signals and should not be limited by the term of art, Secondary Synchronization Signal.

The following examples apply to various aspects of the Disclosure:

In Example 1, a method of synchronization signal correlation is disclosed, comprising: receiving a wireless communication comprising a synchronization signal ("SS") on a plurality of receive antennas of a mobile communication device;
revising a first SS received on a first receive antenna,
revising a second SS received on a second receive antenna;
conditioning the first and second revised signals by constructively and destructively combining the first and second revised signals;
selecting an optimized conditioned signal from the conditioned first and second revised signals;
correlating the optimized conditioned signal with a series of candidate SSs; and selecting the correlation with a largest magnitude as a transmitted SS.

In Example 2, the method of Example 1 is disclosed, wherein the SS is a Secondary Synchronization Signal, and wherein the Secondary Synchronization Signal is pursuant to 5G Standards for Physical Channels and Modulation Section 6.8.2.

In Example 3, the method of any one of Example 1 or 2 is disclosed, further comprising the plurality of receive antennas being at least two receive antennas.

In Example 4, the method of any one of Examples 1 to 3 is disclosed, further comprising the plurality of receive antennas being at least four receive antennas.

In Example 5, the method of any one of Examples 1 to 4 is disclosed, further comprising conditioning the revised signals received by each receive antenna.

In Example 6, the method of Example 5 is disclosed, further comprising conditioning the revised signals by constructively and destructively combining the revised signal from each receive antenna.

In Example 7, the method of any one of Examples 1 to 6 is disclosed, further comprising a duration of the wireless communication being at least about 5 ms.

In Example 8, the method of any one of Examples 1 to 7 is disclosed, further comprising the wireless communication being at least a length of about one half-frame.

In Example 9, the method of any one of Examples 1 to 8 is disclosed, further comprising the first receive antenna and the second antenna receiving a wireless communication comprising flat-fading channels.

In Example 10, the method of any one of Examples 1 to 9 is disclosed, further comprising a channel of the first receive antenna and a channel of the second receive antenna, wherein each channel comprises one channel tap.

In Example 11, the method of any one of Examples 1 to 10 is disclosed, further comprising receiving the SS on a different subcarrier than a Primary Synchronization Signal.

In Example 12, the method of any one of Examples 1 to 11 is disclosed, further comprising a subcarrier carrying the synchronization signal being substantially flat over the SS occupied bandwidth.

In Example 13, the method of any one of Examples 1 to 12 is disclosed, further comprising receiving the wireless communication on an LTE network.

In Example 14, the method of any one of Examples 1 to 13 is disclosed, further comprising receiving the wireless communication on a 5G network.

In Example 15, the method of any one of Examples 1 to 14 is disclosed, wherein the synchronization signal is a Binary Phase Shift Keying signal.

In Example 16, the method of any one of Examples 1 to 15 is disclosed, further comprising revising the synchronization signals by element-wise squaring the synchronization signals.

In Example 17, the method of Example 16 is disclosed, further comprising the element-wise squaring of the synchronization signal generating a 180-degree ambiguity in a phase-angle of the synchronization signal.

In Example 18, the method of Example 17 is disclosed, wherein the 180-degree ambiguity is plus or minus one on a complex plane.

In Example 19, the method of any one of Examples 1 to 18 is disclosed, wherein the wireless communication received on each of the receive antennas comprises a phase shift.

In Example 20, the method of Examples 19 is disclosed, wherein a phase shift for each receive antenna is unique.

In Example 21, the method of Examples 19 is disclosed, wherein a phase shift for each receive antenna is random.

In Example 22, the method of any one of Examples 1 to 21 is disclosed, further comprising revising the first synchronization signal received on the first receive antenna by performing an element-wise squaring of the first SS.

In Example 23, the method of any one of Examples 1 to 22 is disclosed, further comprising revising the second synchronization signal received on the second receive antenna by performing an element-wise squaring of the second synchronization signal.

In Example 24, the method of any one of Examples 1 to 21 is disclosed, further comprising revising the first and second synchronization signals received on the first and second receive antennas by performing an element-wise squaring of the first and second synchronization signals.

In Example 25, the method of any one of Examples 1 to 24 is disclosed, further comprising calculating a complex coefficient by summing the element-wise squared synchronization signals.

In Example 26, the method of any one of Examples 1 to 25 is disclosed, further comprising calculating a phase angle by element-wise squaring the synchronization signal and dividing a resulting doubled phase angle by two.

In Example 27, the method of any one of Examples 1 to 26 is disclosed, further comprising rotating the first synchronization signal received on the first receive antenna by the phase angle to correct a phase of the synchronization signal.

In Example 28, the method of any one of Examples 1 to 27 is disclosed, further comprising rotating the second synchronization signal received on the second receive antenna by the phase angle to correct a phase of the synchronization signal.

In Example 29, the method of any one of Examples 1 to 28 is disclosed, further comprising rotating the synchronization signal received on each receive antenna by the phase angle to correct a phase of the synchronization signal.

In Example 30, the method of any one of Examples 1 to 29 is disclosed, further comprising performing an element-wise phase correction of the synchronization signal by multiplying the elements of the synchronization signal with an inverse of a phase angle of the complex coefficient.

In Example 31, the method of Example 30 is disclosed, wherein the inverse of the phase angle of the complex coefficient is a complex conjugate of the synchronization signal.

In Example 32, the method of Examples 30 or 31 is disclosed, further comprising multiplying the synchronization signal with an inverse of the phase angle of the complex coefficient to obtain a channel and phase corrected synchronization signal with a 180-degree phase ambiguity.

In Example 33, the method of any one of Examples 1 to 32 is disclosed, further comprising correcting a synchronization signal from each receive antenna for channel and phase to obtain a plurality of combinable revised signals.

In Example 34, the method of any one of Examples 1 to 33 is disclosed, wherein the constructive and destructive combination of the revised signals generates a combined signal with a corrected phase ambiguity.

In Example 35, the method of any one of Examples 1 to 34 is disclosed, further comprising combining a first revised signal and a second revised signal prior to correlating the optimized conditioned signal with a series of candidate synchronization signals.

In Example 36, the method of any one of Examples 1 to 35 is disclosed, further comprising correlating the optimized conditioned signal with a series of candidate synchronization signals by performing an M-Sequence Transform on the constructive or destructive combination with a largest Euclidian norm.

In Example 37, the method of any one of Examples 1 to 36 is disclosed, wherein the M-Sequence Transform is a Fast-Hadamard Transform.

In Example 38, the method of any one of Examples 1 to 36 is disclosed, wherein the M-Sequence Transform is a Walsh-Hadamard Transform.

In Example 39, the method of any one of Examples 1 to 38 is disclosed, wherein the M-Sequence Transform is a Fourier Transform.

In Example 40, the method of any one of Examples 1 to 39 is disclosed, wherein the series of candidate synchronization signals comprises 62 synchronization signal candidates.

In Example 41, the method of any one of Examples 1 to 40 is disclosed, wherein the series of candidate synchronization signals is used to discover a physical-layer cell-identity group.

In Example 42, the method of any one of Examples 1 to 41 is disclosed, wherein the series of candidate synchronization signals further comprises secondary synchronization signal candidates.

In Example 43, the method of any one of Examples 1 to 42 is disclosed, wherein the series of candidate synchronization signals further comprises synchronization signal candidates in accordance with 5G standard.

In Example 44, the method of any one of Examples 1 to 43 is disclosed, further comprising performing only one M-Sequence Transform for synchronization signal detection.

In Example 45, the method of any one of Examples 1 to 44 is disclosed, further comprising correlating the optimized conditioned signal by performing an M-Sequence transform, wherein a dot product of the optimized conditioned signal and the series of candidate synchronization signals is calculated.

In Example 46, the method of any one of Examples 1 to 45 is disclosed, wherein the correlation with the transmitted synchronization signal is a Secondary Synchronization Signal received in the wireless communication.

In Example 47, the method of any one of Examples 1 to 46 is disclosed, further comprising identifying a Physical Cell ID using the transmitted synchronization signal.

In Example 48, the method of any one of Examples 1 to 47 is disclosed, further comprising identifying a start and end of a subframe using the transmitted synchronization signal.

In Example 49, the method of any one of Examples 1 to 48 is disclosed, further comprising performing said method for each of a plurality of Secondary Search Signal hypotheses.

In Example 50, the method of any one of Examples 1 to 49 is disclosed, further comprising performing the signal revision on the synchronization signal received on a third receive antenna.

In Example 51, the method of any one of Examples 1 to 50 is disclosed, further comprising performing the signal revision on the synchronization signal received on a fourth receive antenna.

In Example 52, the method of any one of Examples 1 to 51 is disclosed, further comprising performing the signal revision on the synchronization signal received on each receive antenna.

In Example 53, the method of any one of Examples 1 to 52 is disclosed, further comprising conditioning each revised signal by constructively and destructively combining the revised signals with each other.

In Example 54, a method of synchronization signal correlation is disclosed, comprising receiving a wireless communication comprising a synchronization signal on a plurality of receive antennas of a mobile communication device;
performing a signal revision on the synchronization signal received on a first receive antenna,
performing the signal revision on the synchronization signal received on a second receive antenna;
conditioning the revised signals by constructively and destructively combining the revised signals;
correlating each of a plurality constructively and destructively combined revised signals with a series of candidate synchronization signals; and
selecting the correlation with a largest magnitude as a transmitted synchronization signal.

In Example 55, the method of Example 54 is disclosed, wherein the signal revision further comprises:
performing an element-wise squaring of the synchronization signal;
calculating a complex coefficient by summing the element-wise squared synchronization signal;
estimating a phase angle of the complex coefficient; and
performing an element-wise phase correction of the synchronization signal.

In Example 56, the method of Example 54 or 55 is disclosed, further comprising correlating each of a plurality of constructively and destructively combined revised signals with a series of candidate synchronization signals by performing an M-Sequence Transform on each constructive or destructive combination.

In Example 57, the method of any one of Examples 54 to 56 is disclosed, wherein the M-Sequence transform comprises calculating a dot product of the revised signals and the series of candidate synchronization signals.

In Example 58 is disclosed, a method of synchronization signal correlation, comprising:
receiving a wireless communication comprising a synchronization signal on a plurality of receive antennas of a mobile communication device;
revising a first synchronization signal received on a first receive antenna,
revising a second synchronization signal received on a second receive antenna;
conditioning the first and second revised signals by constructively and destructively combining the first and second revised signals;
correlating each of a plurality constructively and destructively combined revised signals with a series of candidate synchronization signals; and
selecting the correlation with a largest magnitude as a transmitted synchronization signal.

In Example 59, the method of Example 58 is disclosed, wherein the signal revision further comprises:
performing an element-wise squaring of the synchronization signal;
calculating a complex coefficient by summing the element-wise squared synchronization signal;
estimating a phase angle of the complex coefficient; and
performing an element-wise phase correction of the synchronization signal.

In Example 60, the method of Example 58 or 59, further comprising correlating each of a plurality of constructively and destructively combined revised signals with a series of candidate synchronization signals by performing an M-Sequence Transform on each constructive or destructive combination.

In Example 61, the method of Claim 60 is disclosed, wherein the M-Sequence transform comprises calculating a dot product of the revised signals and the series of candidate synchronization signals.

In Example 62, an apparatus, including circuitry is disclosed, configured to perform the method of any one of Examples 1 through 61.

In Example 63, a user device configured to perform the method of any one of Examples 1 through 61 is disclosed.

In Example 64, a device is disclosed, including, but not limited to, a computer, a desktop computer, a smartphone, a wearable device, a motor vehicle, an appliance, a home management system, a positioning system, a mapping system, or any other device with a wireless network connection, configured to perform the method of any one of Examples 1 through 61.

In Example 65, a device configured to connect to a wireless network through 5G, configured to perform the method of any one of Examples 1 through 61 is disclosed.

In Example 66, a system for synchronization signal correlation is disclosed, comprising:
a plurality of receive antennas;
a radio frequency transceiver, configured to receive a wireless communication from a receive antenna;
a baseband modem, configured to receive a wireless communication from the radio frequency transceiver and transmit the wireless communication to an application processor in accordance with a mobile communication protocol;
and the application processor, configured to execute program instructions;
wherein the application processor:
revises a first synchronization signal from a first receive antenna;
revises a second synchronization signal from a second receive antenna;
conditions the first and second revised synchronization signals by constructively and destructively combining the first and second revised synchronization signals;
selects an optimized conditioned signal from the conditioned signals;
correlates the optimized conditioned signal with a series of candidate synchronization signals;
and selects the correlation with a largest magnitude as a transmitted synchronization signal.

In Example 67, the system for synchronization signal correlation of Example 66 is disclosed, wherein revising the first synchronization signal further comprises element-wise squaring the first synchronization signal.

In Example 68, the system for synchronization signal correlation of Example 66 or 67 is disclosed, wherein revising the second synchronization signal further comprises element-wise squaring the second synchronization signal.

In Example 69, the system for synchronization signal correlation of any one of Examples 66 to 68 is disclosed, wherein revising the first and second synchronization signals further comprises element-wise squaring the first and second synchronization signals.

In Example 70, the system for synchronization signal correlation of any one of Examples 66 to 69 is disclosed, wherein selecting the optimized conditioned signal further comprises selecting the constructive or destructive combination with a largest Euclidian norm.

In Example 71, the system for synchronization signal correlation of any one of Examples 66 to 70 is disclosed, further comprising correlating the optimized conditioned signal with a series of candidate synchronization signals by performing a fast-Hadamard transform.

In Example 72, the system for synchronization signal correlation of any one of Examples 66 to 71 is disclosed, further comprising correlating the optimized conditioned signal with a series of candidate synchronization signals by performing a Fourier Transform.

In Example 73, a means for synchronization signal correlation is disclosed, comprising an apparatus to receive a wireless communication comprising a synchronization signal on a plurality of receive antennas of a mobile communication device;
a computational circuit arrangement to perform a signal revision on the synchronization signal received on a first receive antenna, the signal revision comprising:
performing an element-wise squaring of the synchronization signal;
calculating a complex coefficient by summing the element-wise squared synchronization signal;
estimating a phase angle of the complex coefficient; and
performing an element-wise phase correction of the synchronization signal;
and to perform the signal revision on the synchronization signal received on one or more additional receive antennas;
a computational circuit arrangement to condition the revised signals by constructively and destructively combining the revised signals;
a computational circuit arrangement to select an optimized conditioned signal, wherein the optimized conditioned signal is the constructive or destructive combination with a largest Euclidian norm; and
a correlator to correlate the optimized conditioned signal with a series of candidate synchronization signals, and to select the correlation with a largest magnitude as a transmitted synchronization signal.

In Example 74, a non-transient computer readable medium is disclosed containing program instructions for causing a computer to perform the method of:
A method of synchronization signal correlation is disclosed, comprising:
receiving a wireless communication comprising a synchronization signal on a plurality of receive antennas of a mobile communication device;
revising a first synchronization signal received on a first receive antenna;
revising a second synchronization signal received on a second receive antenna;
conditioning the first and second revised signals by constructively and destructively combining the first and second revised signals;
selecting an optimized conditioned signal from the conditioned first and second revised signals;
correlating the optimized conditioned signal with a series of candidate synchronization signals; and
selecting the correlation with a largest magnitude as a transmitted synchronization signal.

In Example 75, a non-transient computer readable medium is disclosed containing program instructions for causing a computer to perform the method of:
A method of synchronization signal correlation is disclosed, comprising:
receiving a wireless communication comprising a synchronization signal on a plurality of receive antennas of a mobile communication device;
revising a first synchronization signal received on a first receive antenna;
revising a second synchronization signal received on a second receive antenna;

conditioning the first and second revised signals by constructively and destructively combining the first and second revised signals;
selecting an optimized conditioned signal from the conditioned first and second revised signals;
correlating the optimized conditioned signal with a series of candidate synchronization signals; and
selecting the correlation with a largest magnitude as a transmitted synchronization signal.

In Example 76, a circuit arrangement for synchronization signal management is disclosed, said circuit arrangement comprising:
a plurality of antennas, configured to receive a wireless communication;
a receiver, configured to receive the wireless communication from the plurality of antennas and transmit the wireless communication for channel correction and phase estimation;
a channel correction circuit, configured to correct a channel of the wireless communication;
a phase estimation circuit, configured to calculate and correct a phase for the wireless communication; and
a transform circuit, configured to perform a synchronization signal correlation;
wherein the channel correction circuit performs a signal revision on a synchronization signal received on each receive antenna by element-wise squaring the synchronization signal;
the phase estimation circuit calculates a complex coefficient of each revised synchronization signal by summing the element-wise squared synchronization signal; determines a phase angle of each complex coefficient; and corrects a phase of each synchronization signal revised on each receive antenna using the determined phase angle of each complex coefficient;
the transform circuit conditions each phase-corrected synchronization signal by constructively and destructively combining the phase corrected synchronization signals;
the transform circuit selects an optimized conditioned signal, wherein the optimized conditioned signal is the constructive or destructive combination with a largest Euclidian norm; correlates the optimized conditioned signal with a series of candidate synchronization signals; and selecting the correlation with a largest magnitude as a transmitted synchronization signal.

In Example 77, a circuit arrangement for synchronization signal management is disclosed, said circuit arrangement comprising
a plurality of antennas, configured to receive a wireless communication;
a receiver, configured to receive the wireless communication from the plurality of antennas and transmit the wireless communication for channel correction and phase estimation;
a channel correction circuit, configured to correct a channel of the wireless communication;
a phase estimation circuit, configured to calculate and correct a phase for the wireless communication; and
a transform circuit, configured to perform a synchronization signal correlation.

In Example 78, the circuit arrangement of Example 77 is disclosed, further comprising the channel correction circuit performing a signal revision on a synchronization signal received on each receive antenna by element-wise squaring the synchronization signal.

In Example 79, the circuit arrangement of Example 77 or 78 is disclosed, further comprising the phase estimation circuit calculating a complex coefficient of each revised synchronization signal by summing the element-wise squared synchronization signal.

In Example 80, the circuit arrangement of any one of Examples 77 to 79 is disclosed, further comprising the phase estimation circuit determining a phase angle of each complex coefficient.

In Example 81, the circuit arrangement of any one of Examples 77 to 80 is disclosed, further comprising the phase estimation circuit correcting a phase of each synchronization signal revised on each receive antenna using the determined phase angle of each complex coefficient.

In Example 82, the circuit arrangement of any one of Examples 77 to 81 is disclosed, further comprising the transform circuit conditioning each phase-corrected synchronization signal by constructively and destructively combining the phase corrected synchronization signals.

In Example 83, the circuit arrangement of any one of Examples 77 to 82 is disclosed, further comprising the transform circuit correlating each conditioned signal with a series of candidate synchronization signals.

In Example 84, the circuit arrangement of any one of Examples 77 to 83 is disclosed, further comprising the transform circuit selecting the correlation with a largest magnitude as a transmitted synchronization signal.

In Example 85, the circuit arrangement of any one of Examples 76 to 84 is disclosed, further comprising the plurality of antennas being two receive antennas.

In Example 86, the circuit arrangement of any one of Examples 76 to 84 is disclosed, further comprising the plurality of antennas being four receive antennas.

In Example 87, the circuit arrangement of any one of Examples 76 to 84 is disclosed, further comprising the plurality of antennas being greater than four receive antennas.

In Example 88, the circuit arrangement of any one of Examples 76 to 87 is disclosed, further comprising the transform circuit conditioning the revised signals by constructively and destructively combining the revised signal from each receive antenna.

In Example 89, the circuit arrangement of any one of Examples 76 to 88 is disclosed, further comprising the antennas receiving the wireless communication on an LTE network.

In Example 90, the circuit arrangement of any one of Examples 76 to 88 is disclosed, further comprising the antennas receiving the wireless communication on a 5G network.

In Example 91, the circuit arrangement of any one of Examples 76 to 90 is disclosed, further comprising the phase estimation circuit calculating the phase angle by element-wise squaring the synchronization signal and dividing a resulting doubled phase angle by two.

In Example 92, the circuit arrangement of any one of Examples 76 to 91 is disclosed, further comprising the phase estimation circuit rotating the synchronization signal received on a first receive antenna by the phase angle to correct a phase of the synchronization signal.

In Example 93, the circuit arrangement of any one of Examples 76 to 92 is disclosed, further comprising the phase estimation circuit performing an element-wise phase correction of the synchronization signal by multiplying the elements of the synchronization signal with an inverse of the phase angle of the complex coefficient.

In Example 94, the circuit arrangement of any one of Examples 76 to 93 is disclosed, further comprising the transform circuit correlating the optimized conditioned signal with a series of candidate synchronization signals by performing an M-Sequence Transform on the constructive or destructive combination with a largest Euclidian norm.

In Example 95, the circuit arrangement of any one of Examples 76 to 94 is disclosed, further comprising the transform circuit correlating each of a plurality constructively and destructively combined revised signals with a series of candidate synchronization signals by performing an M-Sequence Transform on each constructive or destructive combination.

In Example 96, the circuit arrangement of any one of Examples 76 to 95 is disclosed, further comprising the transform circuit correlating the optimized conditioned signal with a series of candidate synchronization signals by performing a Fast-Hadamard Transform.

In Example 97, the circuit arrangement of any one of Examples 76 to 96 is disclosed, further comprising the transform circuit correlating the optimized conditioned signal with a series of candidate synchronization signals by performing a Walsh-Hadamard Transform.

In Example 98, the circuit arrangement of any one of Examples 76 to 97 is disclosed, further comprising the transform circuit correlating the optimized conditioned signal with a series of candidate synchronization signals by performing a Fourier Transform.

In Example 99, Machine-readable storage including machine-readable instructions, when executed, to implement a method or realize an apparatus as stated in any preceding Example are disclosed.

In Example 100, the method of any one of Examples 1 to 61 is disclosed, wherein the optimized conditioned signal is the constructive or destructive combination with a largest Euclidian norm.

In Example 101, a method for leveraging secondary synchronization signal properties to improve synchronization signal detection is disclosed, comprising receiving a wireless communication comprising a synchronization signal on a plurality of receive antennas of a mobile communication device; performing a signal revision on the SS received on a first receive antenna, the signal revision comprising performing an element-wise squaring of the SS; calculating a complex coefficient by summing the element-wise squared SS; estimating a phase angle of the complex coefficient; and performing an element-wise phase correction of the SS; performing the signal revision on the SS received on a second receive antenna; conditioning the revised signals by constructively and destructively combining the revised signals; selecting an optimized conditioned signal, wherein the optimized conditioned signal is the constructive or destructive combination with a largest Euclidian norm; correlating the optimized conditioned signal with a series of candidate SSs; and selecting the correlation with a largest magnitude as a transmitted SS.

In Example 102, a method for leveraging secondary synchronization signal properties to improve synchronization signal detection is disclosed, comprising receiving a wireless communication comprising a synchronization signal on a plurality of receive antennas of a mobile communication device; performing a signal revision on the SS received on a first receive antenna, the signal revision comprising performing an element-wise squaring of the SS; calculating a complex coefficient by summing the element-wise squared SS; estimating a phase angle of the complex coefficient; and performing an element-wise phase correction of the SS; performing the signal revision on the SS received on a second receive antenna, conditioning the revised signals by constructively and destructively combining the revised signals; correlating each of a plurality constructively and destructively combined revised signals with a series of candidate SSs; and selecting the correlation with a largest magnitude as a transmitted SS.

What is claimed is:

1. A method of synchronization signal correlation, comprising:
    receiving a wireless communication comprising a synchronization signal on a plurality of receive antennas of a mobile communication device;
    revising a first synchronization signal received on a first receive antenna;
    revising a second synchronization signal received on a second receive antenna;
    conditioning the first and second revised signals by constructively and destructively combining the first and second revised signals;
    selecting an optimized conditioned signal from the conditioned first and second revised signals;
    correlating the optimized conditioned signal with a series of candidate synchronization signals; and
    selecting the correlation with a largest magnitude as a transmitted synchronization signal.

2. The method of claim 1, wherein the synchronization signal is a Secondary Synchronization Signal, and wherein the Secondary Synchronization Signal is pursuant to 5G Standards for Physical Channels and Modulation Section 6.8.2.

3. The method of claim 1, wherein the synchronization signal is a Binary Phase Shift Keying signal.

4. The method of claim 1, further comprising revising the synchronization signals by element-wise squaring the synchronization signals.

5. The method of claim 1, further comprising calculating a phase angle by element-wise squaring the synchronization signal and dividing a resulting doubled phase angle by two.

6. The method of claim 5, further comprising calculating a complex coefficient by summing the element-wise squared synchronization signals.

7. The method of claim 6, further comprising multiplying the synchronization signal with an inverse of a phase angle of the complex coefficient to obtain a channel and phase corrected synchronization signal with a 180-degree phase ambiguity.

8. The method of claim 1, wherein the optimized conditioned signal is the constructive or destructive combination with a largest Euclidian norm.

9. The method of claim 1, further comprising correlating the optimized conditioned signal with a series of candidate synchronization signals by performing an M-Sequence Transform on the constructive or destructive combination with a largest Euclidian norm.

10. The method of claim 9, wherein the M-Sequence Transform is a Fast-Hadamard Transform.

11. The method of claim 9, further comprising correlating the optimized conditioned signal by performing an M-Sequence transform, wherein a dot product of the optimized conditioned signal and the series of candidate synchronization signals is calculated.

12. A method of synchronization signal correlation, comprising:
    receiving a wireless communication comprising a synchronization signal on a plurality of receive antennas of a mobile communication device;
    performing a signal revision on the synchronization signal received on a first receive antenna;
    performing the signal revision on the synchronization signal received on a second receive antenna;

conditioning the revised signals by constructively and destructively combining the revised signals;
correlating each of a plurality constructively and destructively combined revised signals with a series of candidate synchronization signals; and
selecting the correlation with a largest magnitude as a transmitted synchronization signal.

13. The method of claim 12, wherein the signal revision further comprises:
performing an element-wise squaring of the synchronization signal;
calculating a complex coefficient by summing the element-wise squared synchronization signal;
estimating a phase angle of the complex coefficient; and
performing an element-wise phase correction of the synchronization signal.

14. A circuit arrangement for synchronization signal management, said circuit arrangement comprising
a plurality of antennas, configured to receive a wireless communication;
a receiver, configured to receive the wireless communication from the plurality of antennas and transmit the wireless communication for channel correction and phase estimation;
a channel correction circuit, configured to correct a channel of the wireless communication;
a phase estimation circuit, configured to calculate and correct a phase for the wireless communication; and
a transform circuit, configured to perform a synchronization signal correlation.

15. The circuit arrangement of claim 14, further comprising the channel correction circuit performing a signal revision on a synchronization signal received on each receive antenna by element-wise squaring the synchronization signal.

16. The circuit arrangement of claim 14, further comprising the transform circuit conditioning each phase-corrected synchronization signal by constructively and destructively combining phase corrected synchronization signals.

17. The circuit arrangement of claim 14, further comprising the transform circuit correlating each conditioned signal with a series of candidate synchronization signals.

18. The circuit arrangement of claim 14, further comprising the phase estimation circuit calculating the phase angle by element-wise squaring the synchronization signal and dividing a resulting doubled phase angle by two.

19. The circuit arrangement of claim 14, further comprising the phase estimation circuit performing an element-wise phase correction of the synchronization signal by multiplying elements of the synchronization signal with an inverse of a phase angle of a complex coefficient obtained by summing an element-wise squaring the synchronization signal.

20. The circuit arrangement of claim 14, further comprising the transform circuit correlating the optimized conditioned signal with a series of candidate synchronization signals by performing an M-Sequence Transform on the constructive or destructive combination with a largest Euclidian norm.

* * * * *